(12) United States Patent
Sato et al.

(10) Patent No.: US 12,055,802 B2
(45) Date of Patent: Aug. 6, 2024

(54) OPTICAL LAMINATE, LIGHT GUIDE ELEMENT, AND AR DISPLAY DEVICE

(71) Applicant: FUJIFILM Corporation, Tokyo (JP)

(72) Inventors: Hiroshi Sato, Minami-ashigara (JP); Yukito Saitoh, Minami-ashigara (JP); Katsumi Sasata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 656 days.

(21) Appl. No.: 17/226,479

(22) Filed: Apr. 9, 2021

(65) Prior Publication Data

US 2021/0231985 A1    Jul. 29, 2021

Related U.S. Application Data

(63) Continuation of application No. PCT/JP2019/039657, filed on Oct. 8, 2019.

(30) Foreign Application Priority Data

Oct. 12, 2018  (JP) ................................ 2018-193470

(51) Int. Cl.
*G02F 1/11*     (2006.01)
*G02F 1/1335*   (2006.01)

(52) U.S. Cl.
CPC ........ *G02F 1/116* (2013.01); *G02F 1/133541* (2021.01); *G02F 1/133543* (2021.01); *G02F 2201/343* (2013.01)

(58) Field of Classification Search
CPC ............... G02F 1/116; G02F 1/133541; G02F 1/133543; G02F 2201/343
See application file for complete search history.

(56) References Cited

U.S. PATENT DOCUMENTS

2013/0027656 A1*  1/2013  Escuti .................. G02B 5/3083
                                                349/193
2016/0033698 A1   2/2016  Escuti et al.
(Continued)

FOREIGN PATENT DOCUMENTS

JP    2014-528597 A    10/2014
JP    2017-522801 A     8/2017
(Continued)

OTHER PUBLICATIONS

Japanese Office Action dated May 10, 2022 for corresponding Application No. 2020-551167, with an English translation.

(Continued)

*Primary Examiner* — Joseph P Martinez
(74) *Attorney, Agent, or Firm* — Birch, Stewart, Kolasch & Birch, LLP

(57)    ABSTRACT

Provided are an optical laminate in which a large diffraction angle can be obtained, a light guide element, and an AR display device. The optical laminate includes, in the following order: a first optically-anisotropic layer that is formed of a composition including a liquid crystal compound and has a liquid crystal alignment pattern in which a direction of an optical axis derived from the liquid crystal compound continuously rotates in at least one in-plane direction; a phase difference layer; and a patterned cholesteric liquid crystal layer that is formed of a composition including a liquid crystal compound and has a liquid crystal alignment pattern in which a direction of an optical axis derived from the liquid crystal compound continuously rotates in at least one in-plane direction, the liquid crystal compound being cholesterically aligned, in which in the first optically-anisotropic layer and the patterned cholesteric liquid crystal layer, the one in-plane directions in which the direction of the optical axis derived from the liquid crystal compound continuously rotates are the same, and rotation directions of the (Continued)

direction of the optical axis derived from the liquid crystal compound in the one in-plane direction are the same.

22 Claims, 12 Drawing Sheets

(56) References Cited

U.S. PATENT DOCUMENTS

2018/0143438 A1\* 5/2018 Oh ..................... G02B 6/0056
2018/0164480 A1 6/2018 Yoshida

FOREIGN PATENT DOCUMENTS

WO WO2014/181539 A1 11/2014
WO WO2016/194961 A1 12/2016

OTHER PUBLICATIONS

International Search Report (Form PCT/ISA/210) for International Application No. PCT/JP2019/039657, dated Dec. 10, 2019, with an English translation.
Kress et al., "Towards the Ultimate Mixed Reality Experience: Hololens Display Architecture Choices," SID 2017 Digest, Jun. 2, 2017, pp. 127-131, 5 pages total.
Written Opinion of the International Searching Authority (Form PCT/ISA/237) for International Application No. PCT/JP2019/039657, dated Dec. 10, 2019, with an English translation.

\* cited by examiner

OPTICAL LAMINATE, LIGHT GUIDE ELEMENT, AND AR DISPLAY DEVICE

CROSS-REFERENCE TO RELATED APPLICATIONS

This application is a Continuation of PCT International Application No. PCT/JP2019/039657 filed on Oct. 8, 2019, which claims priority under 35 U.S.C. § 119(a) to Japanese Patent Application No. 2018-193470 filed on Oct. 12, 2018. The above application is hereby expressly incorporated by reference, in its entirety, into the present application.

BACKGROUND OF THE INVENTION

1. Field of the Invention

The present invention relates to an optical laminate that reflects light, and a light guide element and an AR display device including the optical laminate.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is diffracted (refracted) using a diffraction element to be incident into one end portion of a light guide plate. As a result, the light is introduced into the light guide plate at an angle such that the light propagates in the light guide plate. The light propagated in the light guide plate is also diffracted by the diffraction element in the other end portion of the light guide plate and is emitted from the light guide plate to an observation position by the user.

As this diffraction grating, a diffraction element formed of liquid crystal is known.

For example, WO2016/194961A discloses a reflective structure comprising: a plurality of helical structures each extending in a predetermined direction; a first incidence surface that intersects the predetermined direction and into which light is incident; and a reflecting surface that intersects the predetermined direction and reflects the light incident from the first incidence surface, in which the first incidence surface includes one of both end portions in each of the plurality of helical structures, each of the plurality of helical structures includes a plurality of structural units that lies in the predetermined direction, each of the plurality of structural units includes a plurality of elements that are helically turned and laminated, each of the plurality of structural units includes a first end portion and a second end portion, the second end portion of one structural unit among structural units adjacent to each other in the predetermined direction forms the first end portion of the other structural unit, alignment directions of the elements positioned in the plurality of first end portions included in the plurality of helical structures are aligned, the reflecting surface includes at least one first end portion included in each of the plurality of helical structures, and the reflecting surface is not parallel to the first incidence surface. WO2016/194961A describes that, since the reflecting surface in the reflective structure is not parallel to the incidence surface, light is reflected in a direction different from in a reflection direction in the case of specular reflection (paragraph "0062").

SUMMARY OF THE INVENTION

In the optical element described in WO2016/194961A, it is difficult to increase a diffraction angle of light. Therefore, in a case where light is caused to be incident from a direction perpendicular to a light guide direction in a light guide plate using the optical element, it is difficult to cause light to be incident at an angle where the light is totally reflected in the light guide plate, and a part of the light leaks from the inside of the light guide plate. Therefore, there is a problem in that the light guide efficiency decreases.

In this optical element, the angle of diffraction of light depends on the angle of the reflecting surface, and the angle of the reflecting surface depends on the period of alignment directions of liquid crystal molecules in a plane direction. Therefore, by decreasing the period of alignment directions of liquid crystal molecules in a plane direction, a large diffraction angle can be obtained. However, as the period decreases, manufacturing becomes difficult. Therefore, it is difficult to obtain a sufficiently large diffraction angle.

An object of the present invention is to solve the problems of the related art and to provide an optical laminate in which a large diffraction angle can be obtained, a light guide element, and an AR display device.

In order to achieve the object, the present invention has the following configurations.

[1] An optical laminate comprising, in the following order:
a first optically-anisotropic layer that is formed of a composition including a liquid crystal compound and has a liquid crystal alignment pattern in which a direction of an optical axis derived from the liquid crystal compound continuously rotates in at least one in-plane direction;
a phase difference layer; and
a patterned cholesteric liquid crystal layer that is formed of a composition including a liquid crystal compound and has a liquid crystal alignment pattern in which a direction of an optical axis derived from the liquid crystal compound continuously rotates in at least one in-plane direction, the liquid crystal compound being cholesterically aligned,
in which in the first optically-anisotropic layer and the patterned cholesteric liquid crystal layer, the one in-plane directions in which the direction of the optical axis derived from the liquid crystal compound continuously rotates are the same, and rotation directions of the direction of the optical axis derived from the liquid crystal compound in the one in-plane direction are the same.

[2] The optical laminate according to [1], in which the phase difference layer is a λ/2 plate.

[3] The optical laminate according to [1] or [2], in which the phase difference layer is a broadband λ/2 plate.

[4] The optical laminate according to any one of claims 1 to 3, in which the phase difference layer has reverse wavelength dispersion properties.

[5] An optical laminate comprising, in the following order:
a first optically-anisotropic layer that is formed of a composition including a liquid crystal compound and has a liquid crystal alignment pattern in which a direction of an optical axis derived from the liquid crystal compound continuously rotates in at least one in-plane direction; and
a patterned cholesteric liquid crystal layer that is formed of a composition including a liquid crystal compound and has a liquid crystal alignment pattern in which a direction of an optical axis derived from the liquid crystal compound continuously rotates in at least one in-plane direction, the liquid crystal compound being cholesterically aligned, in which in the first optically-anisotropic layer and the patterned cholesteric liquid crystal layer, the one in-plane directions in which the direction of the optical axis derived from the liquid crystal compound continuously rotates are the same, and rotation directions of the direction of the optical axis derived from the liquid crystal compound in the one in-plane direction are opposite to each other.

[6] The optical laminate according to any one of [1] to [5], in which in a case where, in the first optically-anisotropic layer and the patterned cholesteric liquid crystal layer, a length over which the direction of the optical axis derived from the liquid crystal compound rotates by 180° in the one in-plane direction in which the direction of the optical axis derived from the liquid crystal compound changes while continuously rotating is set as a single period, lengths of single periods in the first optically-anisotropic layer and the patterned cholesteric liquid crystal layer are the same.

[7] The optical laminate according to any one of [1] to [6], comprising:
two or more first optically-anisotropic layers.

[8] The optical laminate according to any one of [1] to [7], in which in the first optically-anisotropic layer, the liquid crystal compound is twisted and aligned in a thickness direction.

[9] The optical laminate according to any one of [1] to [8], comprising:
two or more patterned cholesteric liquid crystal layers having different selective reflection wavelengths.

[10] The optical laminate according to [9],
in which in the two or more patterned cholesteric liquid crystal layers, turning directions of circularly polarized light to be reflected are the same.

[11] The optical laminate according to any one of [1] to [10], further comprising:
a second optically-anisotropic layer that is formed of a composition including a liquid crystal compound and has a liquid crystal alignment pattern in which a direction of an optical axis derived from the liquid crystal compound continuously rotates in at least one in-plane direction, the second optically-anisotropic layer being formed on a side of the patterned cholesteric liquid crystal layer opposite to the optically-anisotropic layer side, in which in the first optically-anisotropic layer and the second optically-anisotropic layer, the one in-plane directions in which the direction of the optical axis derived from the liquid crystal compound continuously rotates are the same.

[12] A light guide element comprising:
the optical laminate according to any one of [1] to [11]; and
a light guide plate.

[13] The light guide element according to [12],
in which the optical laminate is disposed at at least either an incidence position or an emission position of light in the light guide plate.

[14] The light guide element according to or [13],
in which in the first optically-anisotropic layer and the patterned cholesteric liquid crystal layer, the one in-plane direction in which the direction of the optical axis derived from the liquid crystal compound continuously rotates is parallel to a light guide direction of light in the light guide plate.

[15] An AR display device comprising:
the light guide element according to any one of to [14]; and
an image display device.

According to the present invention, an optical laminate in which a large diffraction angle can be obtained, a light guide element, and an AR display device can be provided.

DESCRIPTION OF THE PREFERRED EMBODIMENTS

Figure 1:
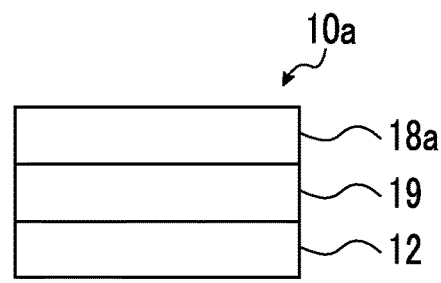
FIG. 1 is a cross-sectional view schematically showing an example a first embodiment of an optical laminate according to the present invention.

Hereinafter, an optical laminate, a light guide element, and an AR display device according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In the present specification, a selective reflection center wavelength refers to an average value of two wavelengths at which, in a case where a minimum value of a transmittance of a target object (member) is represented by Tmin (%), a half value transmittance: T1/2(%) represented by the following expression is exhibited.

$$T1/2=100-(100-T\min)\div 2$$
Expression for obtaining Half Value Transmittance:

In addition, selective reflection center wavelengths of a plurality of layers being "equal" does not represent that the selective reflection center wavelengths are exactly equal, and error is allowed in a range where there are no optical effects. Specifically, selective reflection center wavelengths of a plurality of objects being "equal" represents a difference between the selective reflection center wavelengths of the respective objects is 20 nm or less, and this difference is preferably 15 nm or less and more preferably 10 nm or less.

Optical Laminate (First Embodiment)

A first embodiment of an optical laminate according to the present invention comprises, in the following order:
a first optically-anisotropic layer that is formed of a composition including a liquid crystal compound and has a liquid crystal alignment pattern in which a direction of an optical axis derived from the liquid crystal compound continuously rotates in at least one in-plane direction;
a phase difference layer; and
a patterned cholesteric liquid crystal layer that is formed of a composition including a liquid crystal compound and has a liquid crystal alignment pattern in which a direction of an optical axis derived from the liquid crystal compound continuously rotates in at least one in-plane direction, the liquid crystal compound being cholesterically aligned,
in which in the first optically-anisotropic layer and the patterned cholesteric liquid crystal layer, the one in-plane directions in which the direction of the optical axis derived from the liquid crystal compound continuously rotates are the same, and rotation directions of the direction of the optical axis derived from the liquid crystal compound in the one in-plane direction are the same.

FIG. 1 is a diagram conceptually showing an example of the first embodiment of the optical laminate according to the present invention.

An optical laminate 10a shown in FIG. 1 has a configuration in which a first optically-anisotropic layer 12, a phase difference layer 19, and a patterned cholesteric liquid crystal layer 18a are laminated in this order.

The first optically-anisotropic layer 12 is a layer that is formed of a composition including a liquid crystal compound, and has a liquid crystal alignment pattern in which a direction of an optical axis derived from the liquid crystal compound continuously rotates in at least one in-plane direction.

The first optically-anisotropic layer 12 refracts (diffracts) incident circularly polarized light to allow transmission of the light in a direction in which the direction of the optical axis continuously rotates. In this case, the diffraction direction varies depending on the turning direction of circularly polarized light.

In addition, the first optically-anisotropic layer 12 changes a turning direction of transmitted circularly polarized light into an opposite direction.

The configuration of the first optically-anisotropic layer 12 will be described below in detail.

The phase difference layer 19 is a layer having a function of imparting a phase difference to two linearly polarized light components included in incident light and perpendicular to each other.

The phase difference layer 19 is preferably a λ/2 plate. That is, the phase difference layer 19 imparts a half-wavelength, that is, a phase difference of 180° to two linearly polarized light components included in incident light and perpendicular to each other. As a result, the phase difference layer 19 converts a turning direction of incident circularly polarized light into an opposite turning direction.

The λ/2 plate may impart a phase difference of 180° at a wavelength of desired light, that is, at any wavelength (for example, 550 nm) in a visible range, an ultraviolet range, or an infrared range, it is preferable that the function of the λ/2 plate is exhibited with respect to a broadband wavelength range, and it is preferable that birefringence has reverse wavelength dispersion properties.

As the λ/2 plate, a well-known λ/2 plate can be used.

The patterned cholesteric liquid crystal layer 18a is a layer that is formed of a composition including a liquid crystal compound, and has a liquid crystal alignment pattern in which a direction of an optical axis derived from the liquid crystal compound continuously rotates in at least one in-plane direction, the liquid crystal compound being cholesterically aligned.

The patterned cholesteric liquid crystal layer 18a reflects circularly polarized light having a selective reflection wavelength in one turning direction, and allows transmission of circularly polarized light in another turning direction and light having a wavelength other than the selective reflection wavelength. In a case where the patterned cholesteric liquid crystal layer 18a reflects circularly polarized light, the patterned cholesteric liquid crystal layer 18a refracts the circularly polarized light in the direction in which the direction of the optical axis continuously rotates, and reflects the refracted light. In this case, a direction of diffracting circularly polarized light changes depending on the rotation direction of the optical axis.

The configuration of the patterned cholesteric liquid crystal layer 18a will be described below in detail.

Here, in the optical laminate 10a according to the first embodiment, in the first optically-anisotropic layer 12 and the patterned cholesteric liquid crystal layer 18a, the one in-plane directions in which the direction of the optical axis derived from the liquid crystal compound continuously rotates are the same, and rotation directions of the direction of the optical axis derived from the liquid crystal compound in the one in-plane direction are the same. That is, the first optically-anisotropic layer 12 and the patterned cholesteric liquid crystal layer 18a diffract incident circularly polarized light in the same direction.

The optical laminate 10a having the above-described configuration diffracts incident light to be reflected. This point will be described below.

Optical Laminate (Second Embodiment)

A second embodiment of the optical laminate according to the present invention comprises, in the following order:
  a first optically-anisotropic layer that is formed of a composition including a liquid crystal compound and has a liquid crystal alignment pattern in which a direction of an optical axis derived from the liquid crystal compound continuously rotates in at least one in-plane direction; and
  a patterned cholesteric liquid crystal layer that is formed of a composition including a liquid crystal compound and has a liquid crystal alignment pattern in which a direction of an optical axis derived from the liquid crystal compound continuously rotates in at least one in-plane direction, the liquid crystal compound being cholesterically aligned,
  in which in the first optically-anisotropic layer and the patterned cholesteric liquid crystal layer, the one in-plane directions in which the direction of the optical axis derived from the liquid crystal compound continuously rotates are the same, and rotation directions of the direction of the optical axis derived from the liquid crystal compound in the one in-plane direction are opposite to each other.

Figure 2:
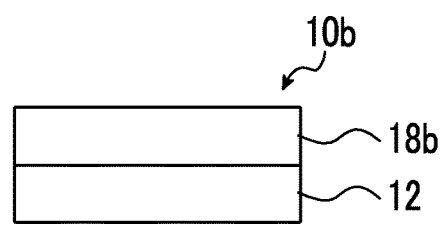
FIG. 2 is a cross-sectional view schematically showing an example a second embodiment of the optical laminate according to the present invention.

FIG. 2 is a diagram conceptually showing an example of a second embodiment of the optical laminate according to the present invention.

An optical laminate 10b shown in FIG. 2 has a configuration in which the first optically-anisotropic layer 12 and a patterned cholesteric liquid crystal layer 18b are laminated in this order.

The first optically-anisotropic layer 12 is the same as the first optically-anisotropic layer 12 according to the first embodiment.

The patterned cholesteric liquid crystal layer 18b has the same configuration as the patterned cholesteric liquid crystal layer 18a according to the first embodiment, except that a direction of diffracting incident light is opposite to that of the patterned cholesteric liquid crystal layer 18a.

That is, the patterned cholesteric liquid crystal layer 18b is a layer that is formed of a composition including a liquid crystal compound, and has a liquid crystal alignment pattern in which a direction of an optical axis derived from the liquid crystal compound continuously rotates in at least one in-plane direction, the liquid crystal compound being cholesterically aligned.

The patterned cholesteric liquid crystal layer 18b reflects circularly polarized light having a selective reflection wavelength in one turning direction, and allows transmission of circularly polarized light in another turning direction and light having a wavelength other than the selective reflection wavelength. In a case where the patterned cholesteric liquid crystal layer 18b reflects circularly polarized light, the patterned cholesteric liquid crystal layer 18b refracts the circularly polarized light in the direction in which the direction of the optical axis continuously rotates, and reflects the refracted light. In this case, a direction of diffracting circularly polarized light changes depending on the rotation direction of the optical axis.

The configuration of the patterned cholesteric liquid crystal layer 18b will be described below in detail.

Here, in the optical laminate 10b according to the second embodiment, in the first optically-anisotropic layer 12 and the patterned cholesteric liquid crystal layer 18b, the one in-plane directions in which the direction of the optical axis derived from the liquid crystal compound continuously rotates are the same, and rotation directions of the direction of the optical axis derived from the liquid crystal compound in the one in-plane direction are opposite to each other. That is, the first optically-anisotropic layer 12 and the patterned cholesteric liquid crystal layer 18b diffract incident circularly polarized light in opposite directions.

The optical laminate 10b having the above-described configuration diffracts incident light to be reflected. This point will be described below.

[Light Guide Element and AR Display Device]

The light guide element according to the embodiment of the present invention includes the above-described optical laminate and a light guide plate.

The Augmented Reality (AR) display device according to the embodiment of the present invention includes the light guide element and an image display device.

Figure 3:
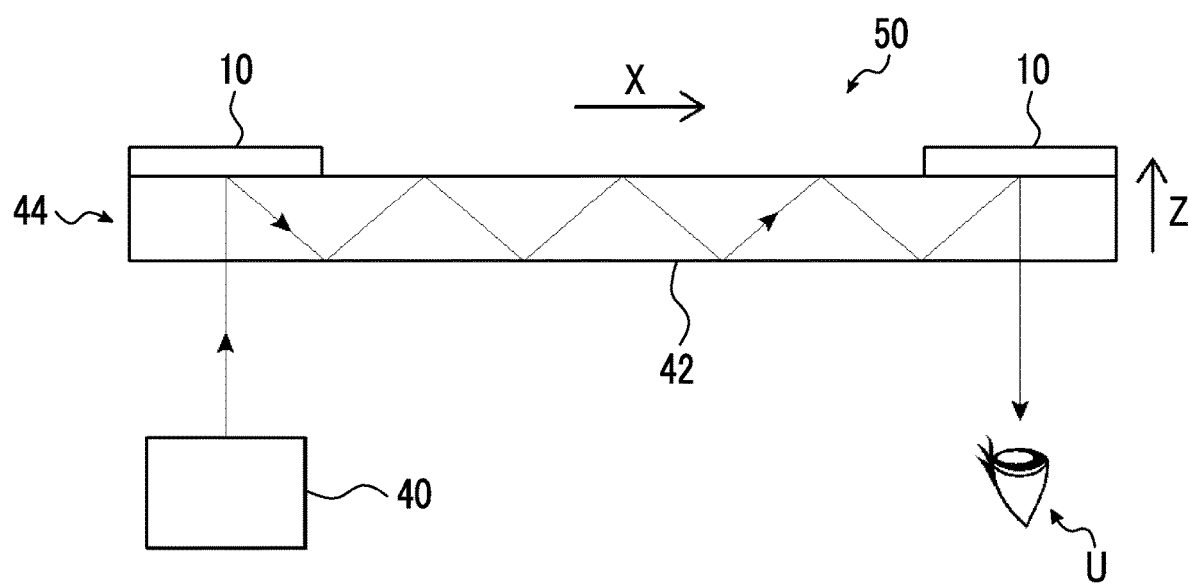
FIG. 3 is a diagram schematically showing an example of an AR display device including the optical laminate according to the present invention.

FIG. 3 conceptually shows an example of the AR display device according to the embodiment of the present invention.

The AR display device shown in FIG. 3 includes a display (image display device) 40 and a light guide element 44.

The light guide element 44 is the light guide element according to the embodiment of the present invention and includes two optical laminates 10 and a light guide plate 42.

The light guide plate 42 guides light in a rectangular shape that is elongated in one direction.

As shown in FIG. 3, the optical laminate 10 is disposed on each of a surface of the light guide plate 42 on one end portion side in a longitudinal direction and a surface of the light guide plate 42 on another end portion side in the longitudinal direction. The disposition positions of the two optical laminates 10 correspond to an incidence position and an emission position of light of the light guide plate 42, respectively. In addition, the two optical laminates 10 are disposed on the same surface of the light guide plate 42.

The light guide plate 42 is not particularly limited, and a well-known light guide plate of the related art that is used in an image display device or the like can be used.

As shown in FIG. 3, the display 40 is disposed on a surface of one end portion of the light guide plate 42 opposite to the surface where the optical laminate 10 is disposed. In addition, a surface of the one end portion of the light guide plate 42 opposite to the surface where the optical laminate 10 is disposed is an observation position of a user U.

In the following description, the longitudinal direction of the light guide plate 42 will be referred to as "X direction", and a direction that is perpendicular to the X direction and perpendicular to the surface of the optical laminate 10 will be referred to as "Z direction". The Z direction may be a laminating direction of the respective layers of the optical laminate 10 (refer to FIG. 4).

The display 40 is not particularly limited. For example, various well-known displays used in AR glasses or the like can be used.

Examples of the display 40 include a liquid crystal display (LCOS including Liquid Crystal On Silicon), an organic electroluminescence display, and digital light processing (DLP).

The display 40 may display a monochrome image, a two-color image, or a color image.

In the AR display device 50 having the above-described configuration, as indicated by arrows, light displayed by the display 40 is incident into the light guide plate 42 from the surface of the one end portion of the light guide plate 42 opposite to the surface where the optical laminate 10 is disposed. The light incident into the light guide plate 42 is reflected from the optical laminate 10. In this case, the light is reflected in a direction having an angle different from that of a specular reflection direction due to the diffraction effect of the optical laminate 10 without being specularly reflected (regularly reflected). In the example shown in FIG. 3, light is incident from a direction (Z direction) substantially perpendicular to the optical laminate 10, and is reflected in a direction that is tilted with a large angle from the perpendicular direction toward the longitudinal direction (X direction) of the light guide plate 42.

Since the light reflected from the optical laminate 10 is reflected with a large angle with respect to the angle of the incidence light, an angle of a light traveling direction with respect to the surface of the light guide plate is small. Therefore, the light is totally reflected from the both surfaces of the light guide plate 42 and is guided in the longitudinal direction (X direction) in the light guide plate 42.

The light guided in the light guide plate 42 is reflected from the optical laminate 10 in another end portion of the light guide plate 42 in the longitudinal direction. In this case, the light is reflected in a direction having an angle different from that of a specular reflection direction due to the diffraction effect of the optical laminate 10 without being specularly reflected. In the example shown in FIG. 3, the light is incident from an oblique direction with respect to the optical laminate 10 and is reflected in a direction perpendicular to the surface of the optical laminate 10.

The light reflected from the optical laminate 10 reaches the surface of the light guide plate 42 opposite to the surface where the optical laminate 10 is disposed, but is incident to be substantially perpendicular to the surface. Therefore, the light is emitted to the outside of the light guide plate 42 without being totally reflected. That is, the light is emitted to the observation position of the user U.

This way, in an AR display device 50, an image displayed by the display 40 is incident into one end of the light guide element 44, propagates in the light guide element 44, and is emitted from another end of the light guide element 44 such that the virtual image is displayed to be superimposed on a scene that is actually being seen by the user U.

Here, the optical laminate 10 according to the embodiment of the present invention can reflect light at a large diffraction angle. This point will be described using FIGS. 4 and 5.

Figure 4:
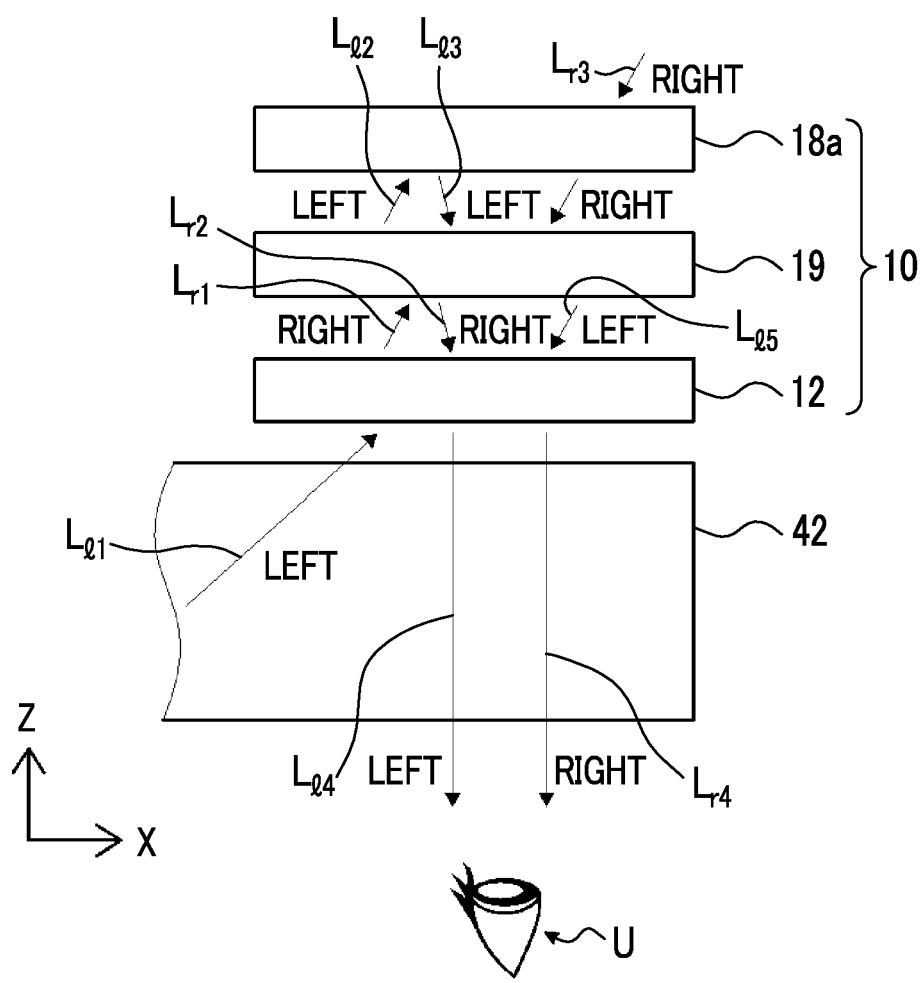
FIG. 4 is a schematic diagram showing an action of the optical laminate according to the first embodiment.

FIG. 4 is an enlarged view showing an emission side end portion of the AR display device 50 of FIG. 3. In addition, FIG. 4 shows an example including the optical laminate 10a according to the first embodiment.

In addition, in FIG. 4, for convenience of description, the light guide plate 42 and the respective layers (the first optically-anisotropic layer 12, the phase difference layer 19, and the patterned cholesteric liquid crystal layer 18a) of the optical laminate 10 are disposed to be spaced from each other.

For example, a case where the light guided in the light guide plate 42 is left circularly polarized light will be described. In a case where left circularly polarized light $L_{l1}$ guided in the light guide plate 42 and incident into the first optically-anisotropic layer 12 of the optical laminate 10 from an oblique direction transmits through the first optically-anisotropic layer 12, the light is diffracted in a direction in which an angle with respect to an axis (Z-axis) perpendicular to the surface of the optical laminate 10 decreases in the X direction. That is, the left circularly polarized light $L_{l1}$ transmitted through the first optically-anisotropic layer 12 is refracted to the left side in the traveling direction as shown in FIG. 4. In addition, the left circularly polarized light $L_{l1}$ transmitted through the first optically-anisotropic layer 12 is converted into right circularly polarized light $L_{r1}$.

The right circularly polarized light $L_{r1}$ transmitted through the first optically-anisotropic layer 12 is incident into the λ/2 plate as the phase difference layer 19. The right circularly polarized light $L_{r1}$ incident into the phase difference layer 19 is converted into left circularly polarized light $L_{l2}$ to which a phase difference of 180° is imparted.

The left circularly polarized light $L_{l2}$ transmitted through the phase difference layer 19 is reflected from the patterned cholesteric liquid crystal layer 18a. That is, in the example shown in FIG. 4, the patterned cholesteric liquid crystal layer 18a reflects left circularly polarized light and allows transmission of right circularly polarized light.

In addition, the left circularly polarized light $L_{l2}$ reflected from the patterned cholesteric liquid crystal layer 18a is refracted to the right side in the traveling direction as shown in FIG. 4. That is, the left circularly polarized light $L_{l2}$ is refracted to the right side with respect to the regular reflection direction. As a result, the light is diffracted in a direction in which an angle with respect to an axis (Z-axis) perpendicular to the surface of the optical laminate 10a decreases.

The left circularly polarized light $L_{l3}$ reflected from the patterned cholesteric liquid crystal layer 18a is incident into the λ/2 plate as the phase difference layer 19. The left circularly polarized light $L_{l3}$ incident into the phase difference layer 19 is converted into right circularly polarized light $L_{r2}$ to which a phase difference of 180° is imparted.

The right circularly polarized light $L_{r2}$ transmitted through the phase difference layer 19 is incident into the first optically-anisotropic layer 12. In a case where the right circularly polarized light $L_{r2}$ incident into the first optically-anisotropic layer 12 transmits through the first optically-anisotropic layer 12, the light is refracted to the right side in the traveling direction as shown in FIG. 4. That is, in a case where the right circularly polarized light $L_{r2}$ transmits through the first optically-anisotropic layer 12, the light is refracted in a direction opposite to the direction in which the left circularly polarized light is refracted in the traveling direction. As a result, the light is diffracted in a direction in which an angle with respect to an axis (Z-axis) perpendicular to the surface of the optical laminate 10a decreases. In addition, the right circularly polarized light $L_{r2}$ transmitted through the first optically-anisotropic layer 12 is converted into left circularly polarized light $L_{l4}$.

The left circularly polarized light $L_{l4}$ transmitted through the first optically-anisotropic layer 12 passes through the inside of the light guide plate 42 and reaches the surface of the light guide plate 42 where the optical laminate 10 is disposed. In this case, an angle of the light traveling direction with respect to the surface of the light guide plate is large. Therefore, the light is emitted to the outside of the light guide plate 42 without being totally reflected from the surface of the light guide plate 42. As a result, the light is emitted at the observation position of the user U.

This way, in the optical laminate 10a according to the first embodiment of the present invention, The light incident into the optical laminate 10 transmits through the first optically-anisotropic layer 12 twice and is reflected from the patterned cholesteric liquid crystal layer 18a once. Since the light is diffracted during the transmissions and the reflection, a diffraction angle more than the diffraction angle of the single first optically-anisotropic layer 12 or the single patterned cholesteric liquid crystal layer 18a can be obtained. For example, the diffraction angle of the single first optically-anisotropic layer 12 and the diffraction angle of the single patterned cholesteric liquid crystal layer 18a are substantially the same, a diffraction angle that is three times or more can be obtained with the optical laminate 10a.

In the description, the action of the optical laminate 10a has been described using the optical laminate 10a disposed on the emission side of the light guide plate 42. However, the same effect can also be obtained in the optical laminate 10 disposed on the incidence side of the light guide plate 42. That is, the optical laminate 10 disposed on the incidence side of the light guide plate 42 can reflect light emitted from the display 40 at the diffraction angle that is about three times the diffraction angle of the single first optically-anisotropic layer 12.

Next, the optical laminate 10b according to the second embodiment will be described.

Figure 5:
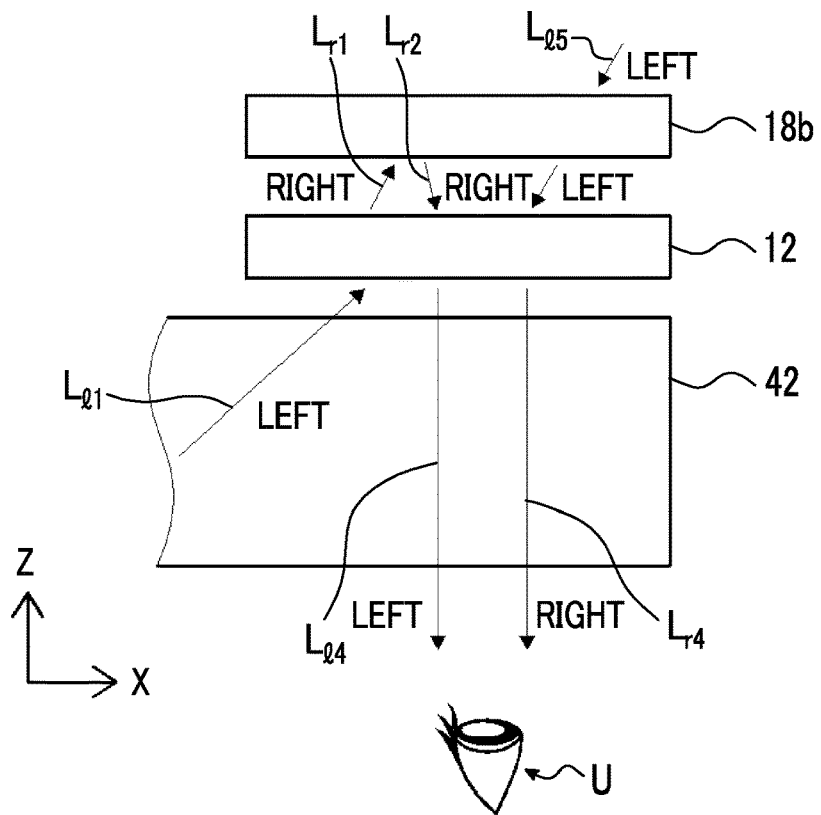
FIG. 5 is a schematic diagram showing an action of the optical laminate according to the second embodiment.

FIG. 5 is an enlarged view showing an emission side end portion of the AR display device 50 of FIG. 3. In addition, FIG. 5 shows an example including the optical laminate 10b according to the second embodiment.

In addition, in FIG. 5, for convenience of description, the light guide plate 42 and the respective layers (the first optically-anisotropic layer 12 and the patterned cholesteric liquid crystal layer 18b) of the optical laminate 10 are disposed to be spaced from each other.

For example, a case where the light guided in the light guide plate 42 is left circularly polarized light will be described. In a case where left circularly polarized light $L_{l1}$ guided in the light guide plate 42 and incident into the first optically-anisotropic layer 12 of the optical laminate 10 from an oblique direction transmits through the first optically-anisotropic layer 12, the light is diffracted in a direction in which an angle with respect to an axis (Z-axis) perpendicular to the surface of the optical laminate 10 decreases in the X direction. That is, the left circularly polarized light $L_{l1}$ transmitted through the first optically-anisotropic layer 12 is refracted to the left side in the traveling direction as shown in FIG. 5. In addition, the left circularly polarized light $L_{l1}$ transmitted through the first optically-anisotropic layer 12 is converted into right circularly polarized light $L_{r1}$.

The right circularly polarized light $L_{r1}$ transmitted through the first optically-anisotropic layer 12 is regularly reflected from the patterned cholesteric liquid crystal layer 18b. That is, in the example shown in FIG. 5, the patterned cholesteric liquid crystal layer 18b reflects right circularly polarized light and allows transmission of left circularly polarized light.

In addition, the right circularly polarized light $L_{r1}$ reflected from the patterned cholesteric liquid crystal layer 18b is refracted to the right side in the traveling direction as shown in FIG. 5. That is, the right circularly polarized light $L_{r1}$ is refracted to the right side with respect to the regular reflection direction. As a result, the light is diffracted in a direction in which an angle with respect to an axis (Z-axis) perpendicular to the surface of the optical laminate 10b decreases.

The right circularly polarized light $L_{r2}$ reflected from the patterned cholesteric liquid crystal layer 18b is incident into the first optically-anisotropic layer 12. In a case where the right circularly polarized light $L_{r2}$ incident into the first optically-anisotropic layer 12 transmits through the first optically-anisotropic layer 12, the light is refracted to the right side in the traveling direction as shown in FIG. 5. That is, in a case where the right circularly polarized light $L_{r2}$ transmits through the first optically-anisotropic layer 12, the light is refracted in a direction opposite to the direction in which the left circularly polarized light is refracted in the traveling direction. As a result, the light is diffracted in a direction in which an angle with respect to an axis (Z-axis) perpendicular to the surface of the optical laminate 10a decreases. In addition, the right circularly polarized light $L_{r2}$ transmitted through the first optically-anisotropic layer 12 is converted into left circularly polarized light $L_{l4}$.

The left circularly polarized light $L_{l4}$ transmitted through the first optically-anisotropic layer 12 passes through the inside of the light guide plate 42 and reaches the surface of the light guide plate 42 where the optical laminate 10 is disposed. In this case, an angle of the light traveling direction with respect to the surface of the light guide plate is large. Therefore, the light is emitted to the outside of the light guide plate 42 without being totally reflected from the surface of the light guide plate 42. As a result, the light is emitted at the observation position of the user U.

This way, in the optical laminate 10b according to the second embodiment of the present invention, the light incident into the optical laminate 10 transmits through the first optically-anisotropic layer 12 twice and is reflected from the patterned cholesteric liquid crystal layer 18b once. Since the light is diffracted during the transmissions and the reflection, a diffraction angle more than the diffraction angle of the single first optically-anisotropic layer 12 or the single patterned cholesteric liquid crystal layer 18b can be obtained. For example, the diffraction angle of the single first optically-anisotropic layer 12 and the diffraction angle of the single patterned cholesteric liquid crystal layer 18b are substantially the same, a diffraction angle that is three times or more can be obtained with the optical laminate 10b.

In the description, the action of the optical laminate 10b has been described using the optical laminate 10b disposed on the emission side of the light guide plate 42. However, the same effect can also be obtained in the optical laminate 10 disposed on the incidence side of the light guide plate 42. That is, the optical laminate 10 disposed on the incidence side of the light guide plate 42 can reflect light emitted from the display 40 at the diffraction angle that is about three times the diffraction angle of the single first optically-anisotropic layer 12.

As described above, in the optical laminate according to the embodiment of the present invention, in a case where light is reflected, light is diffracted at the diffraction angle that is about three times the diffraction angle of the single optically-anisotropic layer. Therefore, even in a case where light is incident from a direction substantially perpendicular to the light guide direction in the light guide plate, light can be diffracted at an angle where light is totally reflected in the light guide plate. In a case where light is guided in the light guide plate, the leak of a part of the light from the inside of the light guide plate can be suppressed, and the light guide efficiency can be improved.

In addition, by arranging the optical laminate at a position where light is emitted from the light guide plate, in a case where light guided in the light guide plate is incident into the optical laminate at an angle where the light is totally reflected, that is, in a case where the light is incident into the surface of the optical laminate at a small angle, the light can be diffracted in a direction substantially perpendicular to the surface of the optical laminate, and the light can be emitted to the outside of the light guide plate.

In addition, in the optical laminate according to the embodiment of the present invention, by laminating the first optically-anisotropic layer and the patterned cholesteric liquid crystal layer, a diffraction angle that is about three times the diffraction angle of the first optically-anisotropic layer can be obtained. Therefore, in order to obtain a large diffraction angle, it is not necessary to decrease the period of the liquid crystal alignment pattern, and manufacturing can be easily performed.

The patterned cholesteric liquid crystal layer 18a according to the first embodiment and the patterned cholesteric liquid crystal layer 18b according to the second embodiment have the same configuration, except that diffraction directions during reflection are different and turning directions of circularly polarized light to be reflected are different. In the following description, in a case where it is not necessary to distinguish between the patterned cholesteric liquid crystal layer 18a and the patterned cholesteric liquid crystal layer 18b, the patterned cholesteric liquid crystal layer 18a and the patterned cholesteric liquid crystal layer 18b will be referred to as "patterned cholesteric liquid crystal layer 18".

Here, as can be seen from FIGS. 4 and 5, with only the configuration where the first optically-anisotropic layer 12 and the patterned cholesteric liquid crystal layer 18 are laminated, there is a problem in that external light is refracted from the first optically-anisotropic layer such that the user U observes the scene at a deviated angle.

On the other hand, it is preferable that the optical laminate according to the embodiment of the present invention further includes a second optically-anisotropic layer on the patterned cholesteric liquid crystal layer 18 (opposite to the first optically-anisotropic layer 12a).

Figure 6:
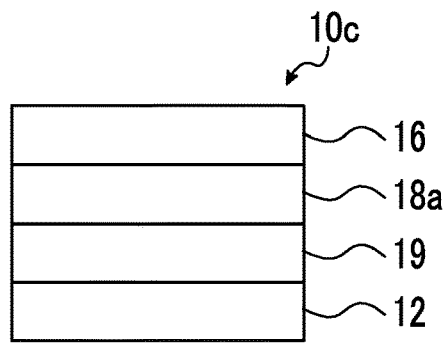
FIG. 6 is a cross-sectional view schematically showing another example of the optical laminate according to the first embodiment.

In the first embodiment, as shown in FIG. 6, a configuration in which the first optically-anisotropic layer 12, the phase difference layer 19, the patterned cholesteric liquid crystal layer 18a, and a second optically-anisotropic layer 16 are provided is preferable.

Here, in the first embodiment, in the first optically-anisotropic layer 12 and the second optically-anisotropic layer 16, the one in-plane directions in which the direction of the optical axis derived from the liquid crystal compound continuously rotates are the same, and rotation directions of the direction of the optical axis derived from the liquid crystal compound in the one in-plane direction are opposite to each other. That is, in the first optically-anisotropic layer 12 and the second optically-anisotropic layer 16, circularly polarized light components in the same turning direction are diffracted in opposite directions.

Figure 7:
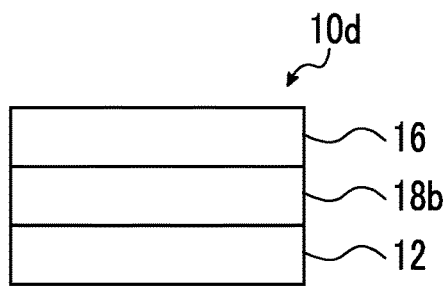
FIG. 7 is a cross-sectional view schematically showing another example of the optical laminate according to the second embodiment.

In addition, in the second embodiment, as shown in FIG. 7, a configuration in which the first optically-anisotropic layer 12, the patterned cholesteric liquid crystal layer 18b, and the second optically-anisotropic layer 16 are provided is preferable.

Here, in the second embodiment, in the first optically-anisotropic layer 12 and the second optically-anisotropic layer 16, the one in-plane directions in which the direction of the optical axis derived from the liquid crystal compound continuously rotates are the same, and rotation directions of the direction of the optical axis derived from the liquid crystal compound in the one in-plane direction are the same. That is, in the first optically-anisotropic layer 12 and the second optically-anisotropic layer 16, circularly polarized light components in the same turning direction are diffracted in the same direction.

As a result, the problem that the scene is observed at a deviated angle can be prevented.

This point will be described using FIGS. 4 and 8 and FIGS. 5 and 9. In the first embodiment, in a case where the second optically-anisotropic layer 16 is not provided as in the example shown in FIG. 4, the right circularly polarized light $L_{r3}$ incident into the patterned cholesteric liquid crystal layer 18a from an oblique direction transmits through the patterned cholesteric liquid crystal layer 18a, is converted into left circularly polarized light Lis by the phase difference layer 19, and is incident into the first optically-anisotropic layer 12. The left circularly polarized light Lis incident into the first optically-anisotropic layer 12 is diffracted to the left side in the traveling direction. In addition, the left circularly polarized light $L_{15}$ transmitted through the first optically-anisotropic layer 12 is converted into right circularly polarized light $L_{r4}$. The right circularly polarized light $L_{r4}$ transmitted through the first optically-anisotropic layer 12 passes through the inside of the light guide plate 42 and is emitted to the outside of the light guide plate 42 from the surface of the light guide plate 42 opposite to the surface where the optical laminate 10 is disposed. As a result, the light is emitted at the observation position of the user U.

In other words, the user U observes the scene in a direction indicated by the arrow of the right circularly polarized light $L_{r3}$ in FIG. 4 as the scene in the front direction (Z direction).

This way, with only the configuration where the first optically-anisotropic layer and the patterned cholesteric liquid crystal layer are laminated, there is a problem in that external light is refracted from the first optically-anisotropic layer such that the user U observes the scene at a deviated angle.

Figure 8:
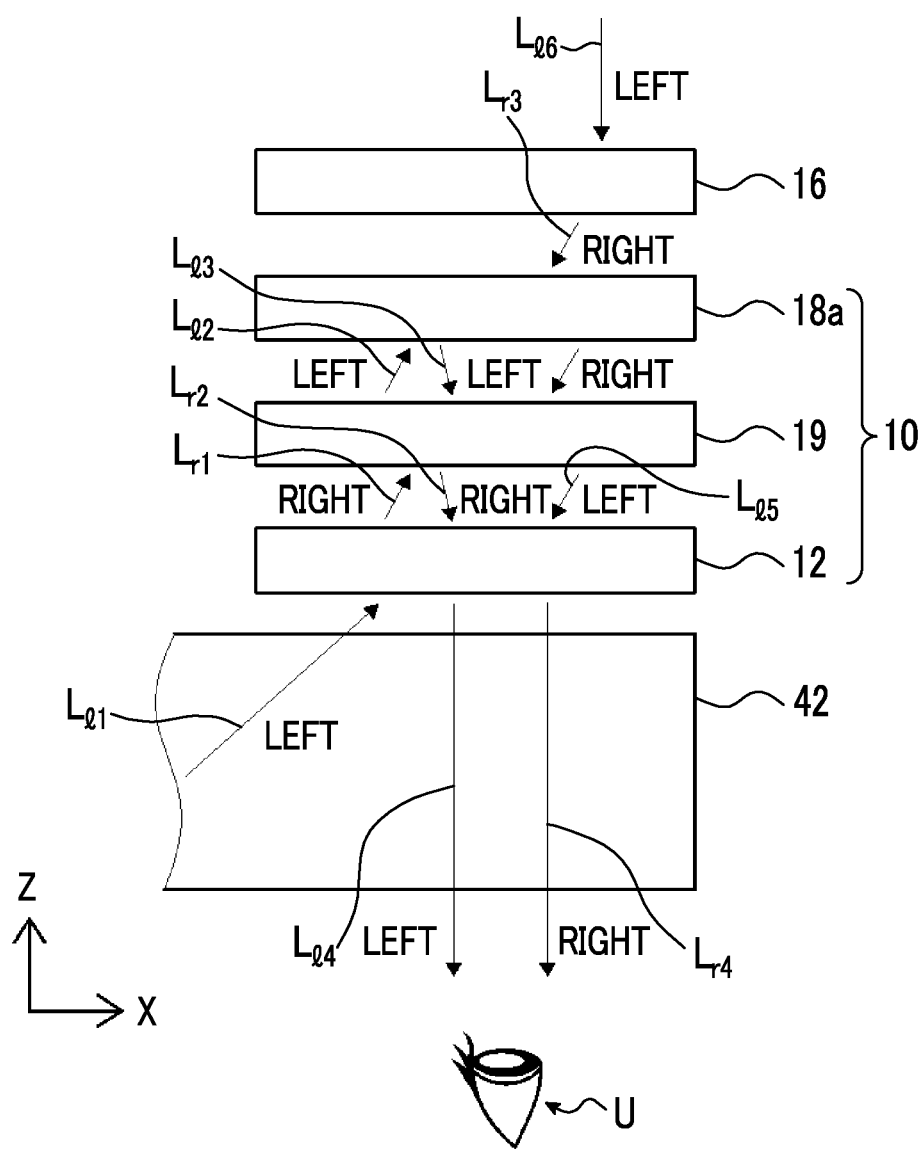
FIG. 8 is a schematic diagram showing an action of the optical laminate of FIG. 6.

On the other hand, as shown in FIG. 8, with the configuration in which the second optically-anisotropic layer 16 is further provided, as shown in FIG. 8, in a case where the left circularly polarized light $L_{16}$ incident into the second optically-anisotropic layer 16 from the front direction (Z direction) of the user U transmits through the second optically-anisotropic layer 16, the light is diffracted to the right side in the traveling direction. In addition, the left circularly polarized light $L_{16}$ transmitted through the second optically-anisotropic layer 16 is converted into right circularly polarized light $L_{r3}$. The right circularly polarized light $L_{r3}$ transmitted through the second optically-anisotropic layer 16 transmits through the patterned cholesteric liquid crystal layer 18a and is incident into the phase difference layer 19.

The right circularly polarized light $L_{r3}$ incident into the phase difference layer 19 is converted into left circularly polarized light Lis by the phase difference layer 19 and is incident into the first optically-anisotropic layer 12.

The left circularly polarized light Lis incident into the first optically-anisotropic layer 12 is diffracted to the left side in the traveling direction. In addition, the left circularly polarized light Lis transmitted through the first optically-anisotropic layer 12 is converted into right circularly polarized light $L_{r4}$. The right circularly polarized light $L_{r4}$ transmitted through the first optically-anisotropic layer 12 passes through the inside of the light guide plate 42 and is emitted to the outside of the light guide plate 42 from the surface of the light guide plate 42 opposite to the surface where the optical laminate 10 is disposed. As a result, the light is emitted at the observation position of the user U.

Here, in the first optically-anisotropic layer 12 and the second optically-anisotropic layer 16, the one in-plane directions in which the direction of the optical axis derived from the liquid crystal compound continuously rotates are the same, and rotation directions of the direction of the optical axis derived from the liquid crystal compound in the one in-plane direction are opposite to each other. That is, in the first optically-anisotropic layer 12 and the second optically-anisotropic layer 16, circularly polarized light components in the same turning direction are diffracted in opposite directions. The diffraction angle of the first optically-anisotropic layer 12 is substantially the same as the diffraction angle of the second optically-anisotropic layer 16. In addition, turning directions of circularly polarized light incident into the first optically-anisotropic layer 12 and circularly polarized light incident into the second optically-anisotropic layer 16 are the same (left circularly polarized light in FIG. 8). Therefore, external light (left circularly polarized light $L_{l6}$) incident into the optical laminate 10 is refracted at the same diffraction angle as that in the opposite direction in the optical laminate 10a. Therefore, light (right circularly polarized light $L_{r4}$) emitted from the optical laminate 10a is substantially parallel to external light incident into the optical laminate 10a.

In other words, the user U observes the scene in a direction indicated by the arrow of the left circularly polarized light $L_{l6}$ in FIG. 8 as the scene in the front direction (Z direction).

Next, the second embodiment will be described.

In the second embodiment, in a case where the second optically-anisotropic layer 16 is not provided as in the example shown in FIG. 5, the left circularly polarized light Lis incident into the patterned cholesteric liquid crystal layer 18b from an oblique direction transmits through the patterned cholesteric liquid crystal layer 18b, and is incident into the first optically-anisotropic layer 12. The left circularly polarized light Lis incident into the first optically-anisotropic layer 12 is diffracted to the left side in the traveling direction. In addition, the left circularly polarized light Lis transmitted through the first optically-anisotropic layer 12 is converted into right circularly polarized light $L_{r4}$. The right circularly polarized light $L_{r4}$ transmitted through the first optically-anisotropic layer 12 passes through the inside of the light guide plate 42 and is emitted to the outside of the light guide plate 42 from the surface of the light guide plate 42 opposite to the surface where the optical laminate 10 is disposed. As a result, the light is emitted at the observation position of the user U.

In other words, the user U observes the scene in a direction indicated by the arrow of the left circularly polarized light $L_{l3}$ in FIG. 5 as the scene in the front direction (Z direction).

This way, even in the second embodiment, with only the configuration where the first optically-anisotropic layer and the patterned cholesteric liquid crystal layer are laminated, there is a problem in that external light is refracted from the first optically-anisotropic layer such that the user U observes the scene at a deviated angle.

Figure 9:
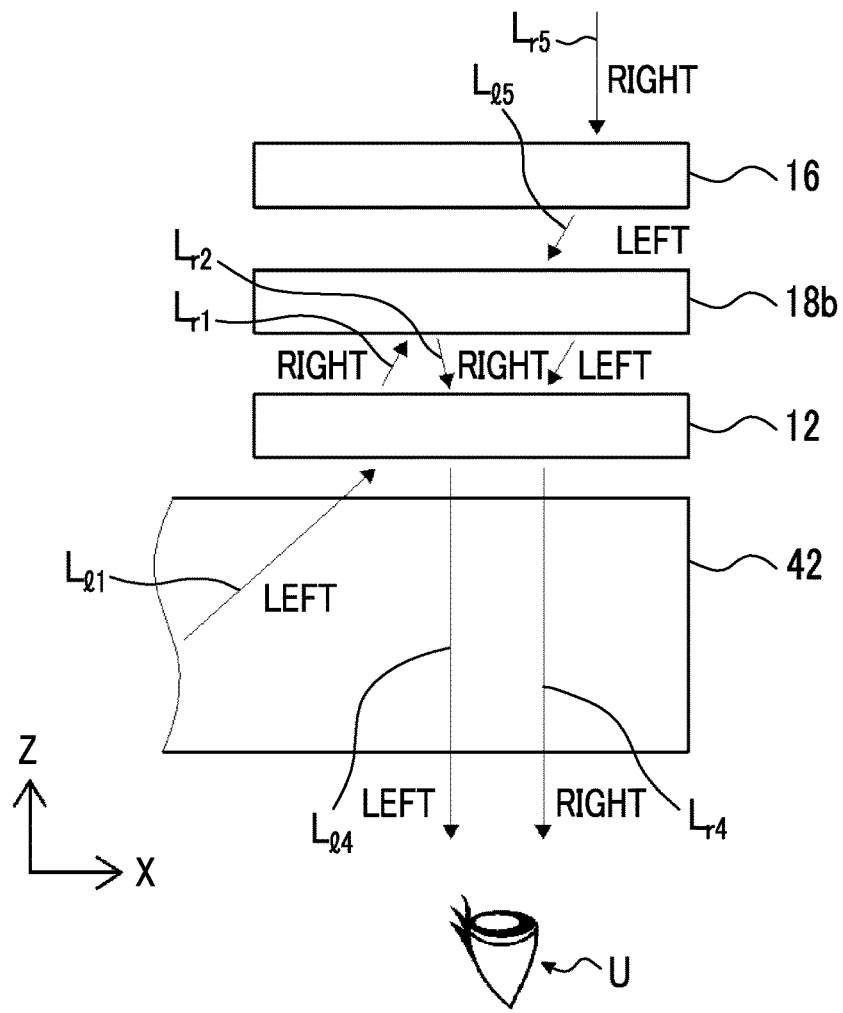
FIG. 9 is a schematic diagram showing an action of the optical laminate of FIG. 7.

On the other hand, as shown in FIG. 9, with the configuration in which the second optically-anisotropic layer 16 is further provided, as shown in FIG. 9, in a case where the right circularly polarized light $L_{r5}$ incident into the second optically-anisotropic layer 16 from the front direction (Z direction) of the user U transmits through the second optically-anisotropic layer 16, the light is diffracted to the right side in the traveling direction. In addition, the right circularly polarized light $L_{r5}$ transmitted through the second optically-anisotropic layer 16 is converted into left circularly polarized light $L_{l5}$. The left circularly polarized light Lis transmitted through the second optically-anisotropic layer 16 transmits through the patterned cholesteric liquid crystal layer 18b and is incident into the first optically-anisotropic layer 12.

The left circularly polarized light Lis incident into the first optically-anisotropic layer 12 is diffracted to the left side in the traveling direction. In addition, the left circularly polarized light $L_{l5}$ transmitted through the first optically-anisotropic layer 12 is converted into right circularly polarized light $L_{r4}$. The right circularly polarized light $L_{r4}$ transmitted through the first optically-anisotropic layer 12 passes through the inside of the light guide plate 42 and is emitted to the outside of the light guide plate 42 from the surface of the light guide plate 42 opposite to the surface where the optical laminate 10 is disposed. As a result, the light is emitted at the observation position of the user U.

Here, in the first optically-anisotropic layer 12 and the second optically-anisotropic layer 16, the one in-plane directions in which the direction of the optical axis derived from the liquid crystal compound continuously rotates are the same, and rotation directions of the direction of the optical axis derived from the liquid crystal compound in the one in-plane direction are the same. That is, in the first optically-anisotropic layer 12 and the second optically-anisotropic layer 16, circularly polarized light components in the same turning direction are diffracted in the same direction. The diffraction angle of the first optically-anisotropic layer 12 is substantially the same as the diffraction angle of the second optically-anisotropic layer 16. In addition, turning directions of circularly polarized light incident into the first optically-anisotropic layer 12 and circularly polarized light incident into the second optically-anisotropic layer 16 are different from each other. Therefore, external light (right circularly polarized light $L_{r5}$) incident into the optical laminate 10b is refracted at the same diffraction angle as that in the opposite direction in the optical laminate 10b. Therefore, light (right circularly polarized light $L_{r4}$) emitted from the optical laminate 10b is substantially parallel to external light incident into the optical laminate 10b.

In other words, the user U observes the scene in a direction indicated by the arrow of the right circularly polarized light $L_{r5}$ in FIG. 9 as the scene in the front direction (Z direction).

As described above, the optical laminate according to the embodiment of the present invention has the configuration in which the first optically-anisotropic layer, the patterned cholesteric liquid crystal layer, and the second optically-anisotropic layer are laminated. As a result, external light can be prevented from being refracted and observed by the user U, and the problem that the scene is observed at a deviated angle can be prevented.

Here, in the example shown in FIGS. 4 and 5, the first optically-anisotropic layer 12 diffracts right circularly polarized light to the right side in the traveling direction and diffracts left circularly polarized light to the left side in the traveling direction, but the embodiment is not limited thereto. The first optically-anisotropic layer 12 may be configured to diffract right circularly polarized light to the left side in the traveling direction and to diffract left circularly polarized light to the right side in the traveling direction.

In addition, in the example shown in FIG. 4, the patterned cholesteric liquid crystal layer 18a is configured to reflect left circularly polarized light and to allow transmission of right circularly polarized light, but the embodiment is not limited thereto. The patterned cholesteric liquid crystal layer 18a may be configured to reflect right circularly polarized light and to allow transmission of left circularly polarized light.

Likewise, in the example shown in FIG. 5, the patterned cholesteric liquid crystal layer 18b is configured to reflect right circularly polarized light and to allow transmission of left circularly polarized light, but the embodiment is not limited thereto. The patterned cholesteric liquid crystal layer 18b may be configured to reflect left circularly polarized light and to allow transmission of right circularly polarized light.

The diffraction directions of light in the first optically-anisotropic layer 12 and the second optically-anisotropic layer 16, the turning directions of light in the patterned cholesteric liquid crystal layer 18 and the patterned cholesteric liquid crystal layer 18b, and the turning directions of circularly polarized light to be reflected from the patterned cholesteric liquid crystal layer 18 and the patterned cholesteric liquid crystal layer 18b may be appropriately set according to the configuration of the AR display device 50 (light guide element 44) in which the optical laminate 10 is used. Specifically, the directions may be set according to the turning direction of light emitted from the display 40, the direction in which light is incident into the optical laminate 10, the direction in which light is emitted from the optical laminate 10, and the like.

In addition, in the example shown in FIGS. 1 and 2, the optical laminate includes one patterned cholesteric liquid crystal layer, but the present invention is not limited thereto. The optical laminate may be configured to include two or more patterned cholesteric liquid crystal layers having different selective reflection wavelengths.

For example, in the AR display device, in a case where a display displays colors using light of three RGB colors, the AR display device may include three patterned cholesteric liquid crystal layers having wavelengths of the three RGB light components emitted from the display as selective reflection wavelengths. With this configuration, in a case where each of the three RGB light components emitted from the display is reflected from the optical laminate, a large diffraction angle can be obtained.

In addition, in a case where two or more patterned cholesteric liquid crystal layers having different selective reflection wavelengths are provided, in order to exhibit the effect of obtaining a large diffraction angle at any wavelength, it is necessary that the turning directions of circularly polarized light to be reflected from the cholesteric liquid crystal layers are the same.

In addition, in the first optically-anisotropic layer 12 and the patterned cholesteric liquid crystal layer 18 of the optical laminate according to the embodiment of the present invention, in a case where a length over which the direction of the optical axis derived from the liquid crystal compound rotates by 180° in the one in-plane direction in which the direction of the optical axis derived from the liquid crystal compound changes while continuously rotating is set as a single period, lengths of single periods in the first optically-anisotropic layer 12 and the patterned cholesteric liquid crystal layer 18 are the same.

Here, although described below in detail, in the first optically-anisotropic layer 12 and the second optically-anisotropic layer 16, it is preferable that the direction in which light is diffracted matches the one in-plane direction in which the direction of the optical axis derived from the liquid crystal compound forming the optically-anisotropic layer continuously rotates in a plane direction. Accordingly, it is preferable that in the first optically-anisotropic layer 12 and the second optically-anisotropic layer 16, the one in-plane direction in which the direction of the optical axis derived from the liquid crystal compound continuously rotates is parallel to a light guide direction of light in the light guide plate 42.

The light guide direction of light in the light guide plate 42 is a direction that connects a position where light is incident into the light guide plate 42 and a position where light is emitted from the light guide plate 42.

In the present invention, although not shown in the drawing, the first optically-anisotropic layer 12, the patterned cholesteric liquid crystal layer 18, the phase difference layer 19, and the second optically-anisotropic layer 16 are bonded to each other through a bonding layer provided between the layers. Alternatively, instead of bonding the layers using the bonding layers, the first optically-anisotropic layer 12, the patterned cholesteric liquid crystal layer 18, the phase difference layer 19, and the second optically-anisotropic layer 16 may be laminated and held by a frame, a holding device, or the like to configure the optical laminate according to the embodiment of the present invention.

As the bonding layer, any layer formed of one of various well-known materials can be used as long as it is a layer that can bond materials as bonding targets. The bonding layer may be a layer consisting of an adhesive that has fluidity during bonding and is a solid after bonding, a layer consisting of a pressure sensitive adhesive that is a gel-like (rubber-like) flexible solid during bonding and of which the gel state does not change after bonding, or a layer consisting of a material having characteristics of both the adhesive and the pressure sensitive adhesive. Accordingly, the bonding layer may be any well-known layer that is used for bonding a sheet-shaped material in an optical device or an optical laminate, for example, an optical clear adhesive (OCA), an optically transparent double-sided tape, or an ultraviolet curable resin.

In addition, in the example shown in FIGS. 1 and 2, in the optical laminate 10, the first optically-anisotropic layer 12, the patterned cholesteric liquid crystal layer 18, and the like are directly laminated, but the embodiment is not limited thereto. The respective layers may be formed and laminated on each support.

In addition, in the present invention, in order to improve visibility for the optical laminate and an image display device, an diffractive optical method of enlarging an exit pupil may be used. Specifically, an optical method of using a plurality of diffractive elements, that is, an optical method of using in-coupling, intermediate and out-coupling diffractive element can be used. This method is described in detail in JP2008-546020A.

Hereinafter, the respective layers forming the optical laminate according to the embodiment of the present invention will be described.

The first optically-anisotropic layer 12 and the second optically-anisotropic layer 16 have the same configuration, and thus will be collectively referred to as the optically-anisotropic layer.

Figure 10:
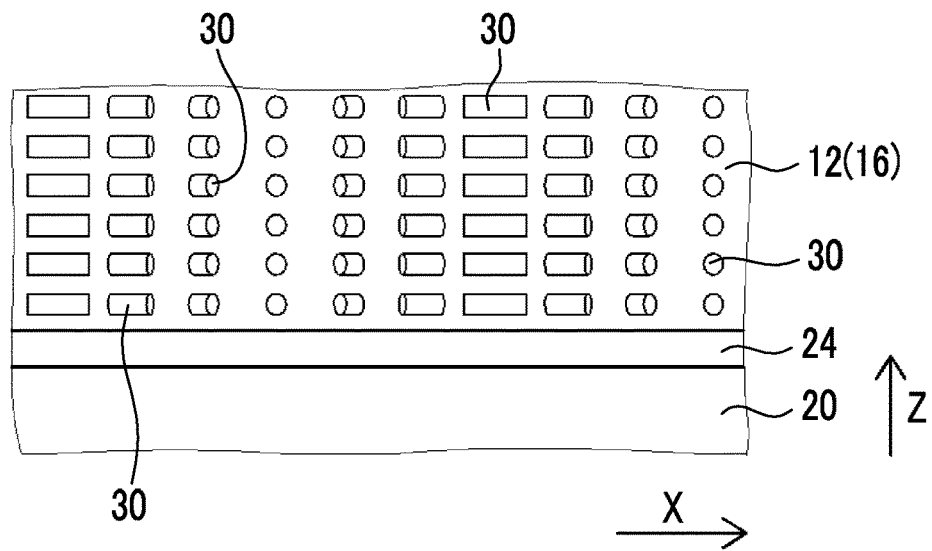
FIG. 10 is a schematic cross-sectional view showing an optically-anisotropic layer.

The optically-anisotropic layer will be described using an optical element in which an optically-anisotropic layer is formed on a support as shown in FIG. 10.

Figure 11:
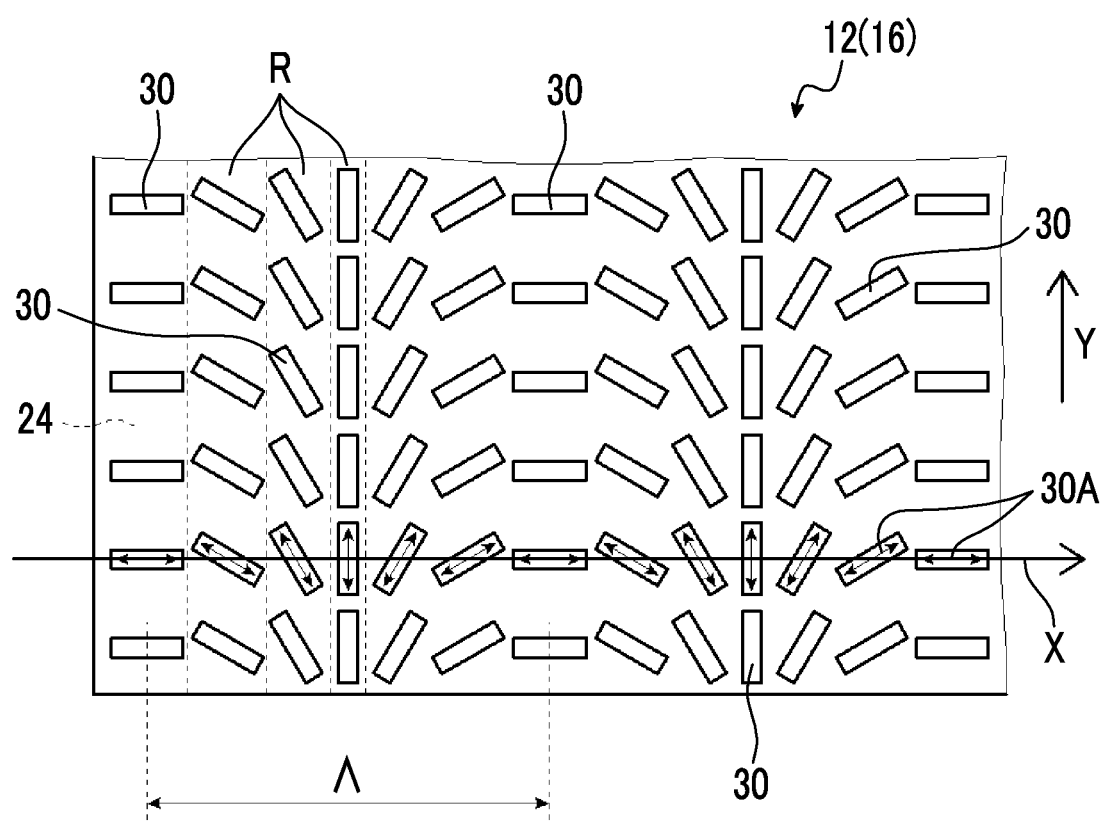
FIG. 11 is a top view showing the optically-anisotropic layer of FIG. 10.

FIG. 10 is a side view conceptually showing an example of the optical element including the optically-anisotropic layer. FIG. 11 is a plan view showing the optical element shown in FIG. 10. The plan view is a view in a case where the optical element is seen from the top in FIG. 10, that is, a view in a case where the optical element is seen from a thickness direction (laminating direction of the respective layers (films)). In other words, the plan view is a view in a case where the optically-anisotropic layer is seen from a direction perpendicular to a main surface.

In addition, in FIG. 11, in order to clarify the configuration of the optical element, only the liquid crystal compound 30 on the surface of the alignment film 24 is shown as the liquid crystal compound 30 in the optically-anisotropic layer. However, in the thickness direction, as shown in FIG. 10, the optically-anisotropic layer has the structure in which the liquid crystal compound 30 is laminated on the liquid crystal compound 30 of the surface of the alignment film 24.

The optical element shown in FIG. 10 includes a support 20, the alignment film 24, and the optically-anisotropic layer 12 (16). The optically-anisotropic layer has a predetermined liquid crystal alignment pattern in which an optical axis derived from the liquid crystal compound continuously rotates in one in-plane direction, the liquid crystal alignment pattern being formed of the composition including the liquid crystal compound.

[Support]

The support 20 is a film-like material (sheet-shaped material or plate-shaped material) that supports the alignment film 24 and the optically-anisotropic layer 12 (16).

A transmittance of the support 20 with respect to light to be reflected from the optical laminate is preferably 50% or higher, more preferably 70% or higher, and still more preferably 85% or higher.

As a material of the support 20, various resins used as a material of a support in an optical element can be used.

Specifically, as the material of the support 20, a support having high transparency is preferable, and examples thereof include a polyacrylic resin such as polymethyl methacrylate, a cellulose resin such as cellulose triacetate, a cycloolefin polymer resin, polyethylene terephthalate (PET), polycarbonate, and polyvinyl chloride. The material of the support 20 is not limited to a resin, and glass may be used.

The thickness of the support 20 is not particularly limited and may be appropriately set depending on the use of the optical element, a material for forming the support 20, and the like in a range where the alignment film and the optically-anisotropic layer can be supported.

The thickness of the support 20 is preferably 1 to 1000 µm, more preferably 3 to 250 µm, and still more preferably 5 to 150 µm.

In the present invention, a configuration in which the optically-anisotropic layer is transferred to another substrate after peeling off the support 20 is also preferably used. That is, by forming the support 20 on the optically-anisotropic layer and peeling the support, as shown in FIG. 1 or the like, a configuration in which the optically-anisotropic layer and the cholesteric liquid crystal layer are laminated directly (through the bonding layer) may be obtained.

[Alignment Film]

The alignment film 24 is formed on the surface of the support 20.

The alignment film 24 is an alignment film for aligning the liquid crystal compound 30 to the predetermined liquid crystal alignment pattern during the formation of the optically-anisotropic layer. In the present invention, the optically-anisotropic layer has a liquid crystal alignment pattern in which a direction of an optical axis 30A (refer to FIG. 11) derived from the liquid crystal compound 30 changes while continuously rotating in one in-plane direction (arrow X direction described below).

In the present invention, in a case where a length over which the direction of the optical axis 30A rotates by 180° in the one in-plane direction in which the direction of the optical axis 30A changes while continuously rotating in the liquid crystal alignment pattern is set as a single period (a rotation period of the optical axis, symbol A in FIG. 11), the optically-anisotropic layer has regions having different lengths of the single periods of the liquid crystal alignment patterns in a plane.

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as @-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the present invention, for example, the alignment film can be suitably used as a so-called photo-alignment film obtained by irradiating a photo-alignable material with polarized light or non-polarized light. That is, in the present invention, a photo-alignment film that is formed by applying a photo-alignable material to the support 20 is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitability used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film is not limited. Any one of various well-known methods corresponding to a material for forming the alignment film can be used. For example, a method including: applying the alignment film to a surface of the support 20; drying the applied alignment film; and exposing the alignment film to laser light to form an alignment pattern can be used.

Figure 12:
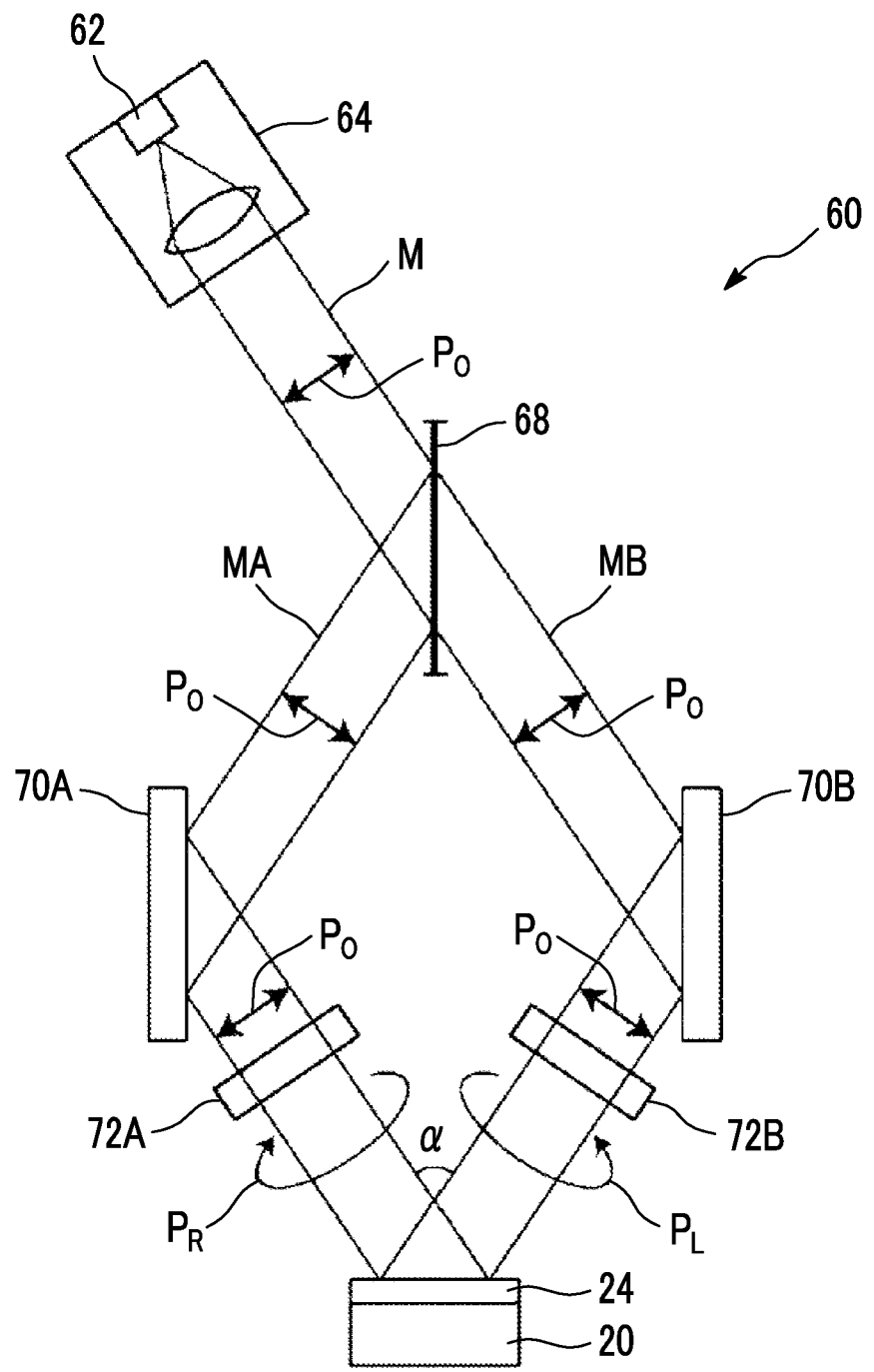
FIG. 12 is a conceptual diagram showing an example of an exposure device that exposes an alignment film.

FIG. 12 conceptually shows an example of an exposure device that exposes the alignment film to form an alignment pattern.

An exposure device 60 shown in FIG. 12 includes: a light source 64 that includes a laser 62 and an λ/2 plate (not shown); a polarization beam splitter 68 that splits laser light M emitted from the laser 62 into two beams MA and MB; mirrors 70A and 70B that are disposed on optical paths of the splitted two beams MA and MB; and λ/4 plates 72A and 72B.

Although not shown in the drawing, the light source 64 includes the λ/2 plate, and the λ/2 plate changes a polarization direction of laser light M emitted from the laser 62 to emit linearly polarized light $P_0$. The λ/4 plates 72A and 72B have optical axes parallel to each other. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 20 including the alignment film 24 on which the alignment pattern is not yet formed is disposed at an exposed portion, the two beams MA and MB intersect and interfere with each other on the alignment film 24, and the alignment film 24 is irradiated with and exposed to the interference light.

Due to the interference in this case, the polarization state of light with which the alignment film 24 is irradiated periodically changes according to interference fringes. As a result, in the alignment film 24, an alignment pattern in which the alignment state periodically changes can be obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 30A derived from the liquid crystal compound 30 continuously rotates in the one in-plane direction, the length of the single period over which the optical axis 30A rotates by 180° in the one in-plane direction in which the optical axis 30A rotates can be adjusted.

By forming the liquid crystal layer on the alignment film having the alignment pattern in which the alignment state periodically changes, as described below, the optically-anisotropic layer having the liquid crystal alignment pattern in which the optical axis 30A derived from the liquid crystal compound 30 continuously rotates in the one in-plane direction can be formed.

In addition, by rotating the optical axes of the λ/4 plates 72A and 72B by 90°, respectively, the rotation direction of the optical axis 30A can be reversed.

In the present invention, the alignment film is provided as a preferable aspect and is not an essential component.

For example, the following configuration can also be adopted, in which, by forming the alignment pattern on the support 20 using a method of rubbing the support 20, a method of processing the support 20 with laser light or the like, or the like, the optically-anisotropic layer has the liquid crystal alignment pattern in which the direction of the optical axis 30A derived from the liquid crystal compound 30 changes while continuously rotating in at least one in-plane direction.

[Optically-Anisotropic Layer]

The optically-anisotropic layer 12 (16) is formed on the surface of the alignment film 24.

As described above, in the present invention, the optically-anisotropic layer is formed of the liquid crystal composition including the liquid crystal compound.

In a case where an in-plane retardation value is set as λ/2, the optically-anisotropic layer has a function of a general λ/2 plate, that is, a function of imparting a phase difference of a half wavelength, that is, 180° to two linearly polarized light components in light incident into the optically-anisotropic layer and are perpendicular to each other.

As shown in FIG. 11, The optically-anisotropic layer has the liquid crystal alignment pattern in which the direction of the optical axis 30A derived from the liquid crystal compound 30 changes while continuously rotating in one direction indicated by arrow X in a plane of the optically-anisotropic layer.

The optical axis 30A derived from the liquid crystal compound 30 is an axis having the highest refractive index in the liquid crystal compound 30, that is, a so-called slow axis. For example, in a case where the liquid crystal compound 30 is a rod-shaped liquid crystal compound, the optical axis 30A is along a rod-shaped major axis direction.

In the following description, "in-plane direction indicated by arrow X" will also be simply referred to as "arrow X direction". In addition, in the following description, the optical axis 30A derived from the liquid crystal compound 30 will also be referred to as "the optical axis 30A of the liquid crystal compound 30" or "the optical axis 30A".

Figure 13:
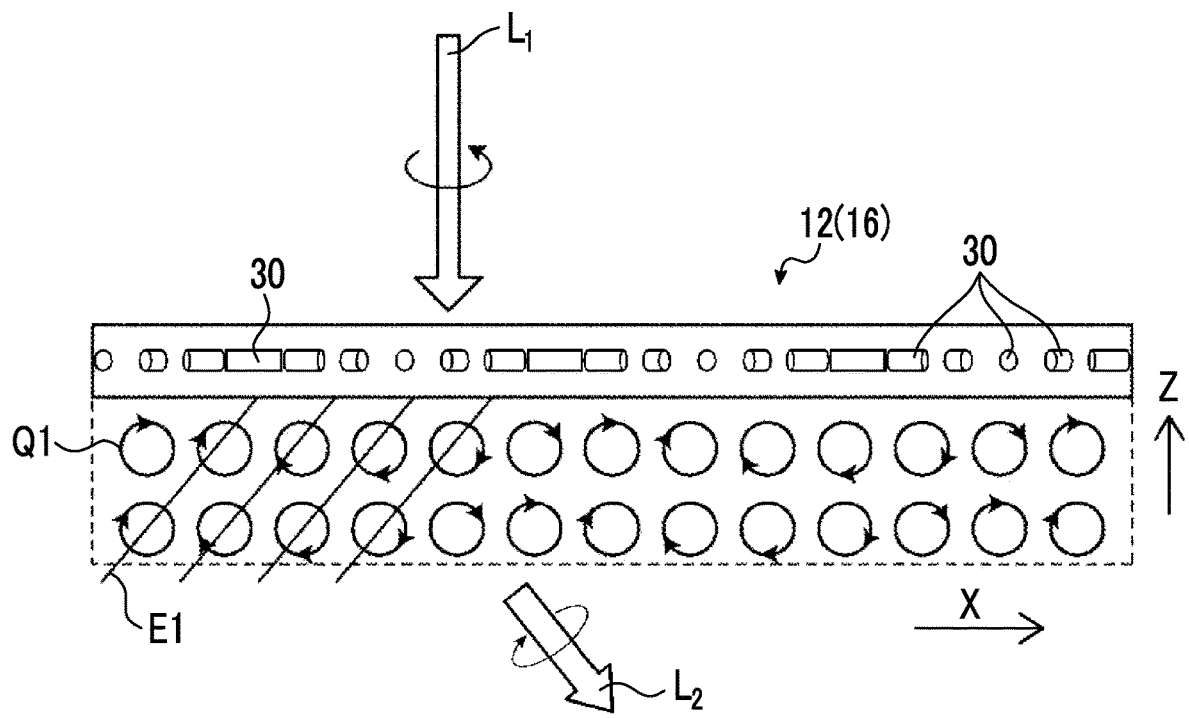
FIG. 13 is a diagram showing the action of the optically-anisotropic layer.
Figure 14:
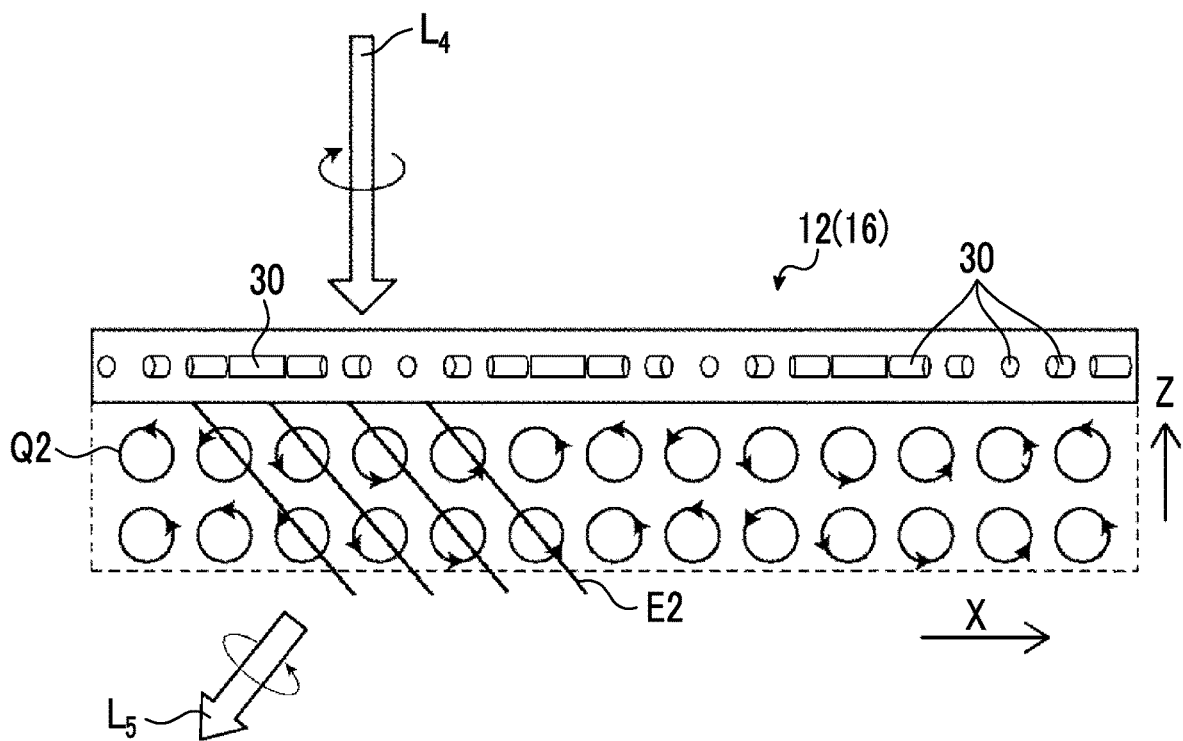
FIG. 14 is a diagram showing the action of the optically-anisotropic layer.

In the optically-anisotropic layer, the liquid crystal compound 30 is two-dimensionally aligned in a plane parallel to the arrow X direction and a Y direction perpendicular to the arrow X direction. In FIG. 10 and FIGS. 13 and 14 described below, the Y direction is a direction perpendicular to the paper plane.

FIG. 11 conceptually shows a plan view of the optically-anisotropic layer.

The optically-anisotropic layer has the liquid crystal alignment pattern in which the direction of the optical axis 30A derived from the liquid crystal compound 30 changes while continuously rotating in the arrow X direction in a plane of the optically-anisotropic layer.

Specifically, "the direction of the optical axis 30A of the liquid crystal compound 30 changes while continuously rotating in the arrow X direction (the predetermined in-plane direction)" represents that an angle between the optical axis 30A of the liquid crystal compound 30, which is disposed in the arrow X direction, and the arrow X direction varies depending on positions in the arrow X direction, and the angle between the optical axis 30A and the arrow X direction sequentially changes from θ to θ+180° or θ−180° in the arrow X direction.

A difference between the angles of the optical axes 30A of the liquid crystal compound 30 adjacent to each other in the arrow X direction is preferably 45° or less, more preferably 15° or less, and still more preferably less than 15°.

On the other hand, regarding the liquid crystal compound 30 forming the optically-anisotropic layer, the liquid crystal compounds 30 having the same direction of the optical axes 30A are disposed at regular intervals in the Y direction perpendicular to the arrow X direction, that is, the Y direction perpendicular to the one in-plane direction in which the optical axis 30A continuously rotates.

In other words, regarding the liquid crystal compound 30 forming the optically-anisotropic layer, in the liquid crystal compounds 30 disposed in the Y direction, angles between the directions of the optical axes 30A and the arrow X direction are the same.

In the present invention, in the liquid crystal alignment pattern of the liquid crystal compound 30, the length (distance) over which the optical axis 30A of the liquid crystal compound 30 rotates by 180° in the arrow X direction in which the direction of the optical axis 30A changes while continuously rotating in a plane is the length A of the single period in the liquid crystal alignment pattern. In other words, the length of the single period in the liquid crystal alignment pattern is defined as the distance between θ and θ+180° that is a range of the angle between the optical axis 30A of the liquid crystal compound 30 and the arrow X direction.

That is, a distance between centers of two liquid crystal compounds 30 in the arrow X direction is the length A of the single period, the two liquid crystal compounds having the same angle in the arrow X direction. Specifically, as shown in FIG. 11, a distance of centers in the arrow X direction of two liquid crystal compounds 30 in which the arrow X direction and the direction of the optical axis 30A match each other is the length A of the single period. In the following description, the length A of the single period will also be referred to as "single period Λ".

In the present invention, in the liquid crystal alignment pattern of the optically-anisotropic layer, the single period A is repeated in the arrow X direction, that is, in the one in-plane direction in which the direction of the optical axis 30A changes while continuously rotating.

As described above, in the liquid crystal compounds disposed in the Y direction in the optically-anisotropic layer, the angles between the optical axes 30A and the arrow X direction (the one in-plane direction in which the direction of the optical axis of the liquid crystal compound 30 rotates) are the same. Regions where the liquid crystal compounds 30 in which the angles between the optical axes 30A and the arrow X direction are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 30 in the direction of the optical axis 30A and a refractive index of the liquid crystal compound 30 in a direction perpendicular to the optical axis 30A in a plane of the region R. That is, the difference Δn in refractive index is the same as the difference in refractive index of the liquid crystal compound.

In a case where circularly polarized light is incident into the above-described optically-anisotropic layer, the light is refracted such that the direction of the circularly polarized light is converted.

This action is conceptually shown in FIG. 13 using the optically-anisotropic layer as an example. In the optically-anisotropic layer, the value of the product of the difference in refractive index of the liquid crystal compound and the thickness of the optically-anisotropic layer is λ/2.

As shown in FIG. 13, in a case where the value of the product of the difference in refractive index of the liquid crystal compound and the thickness of the optically-anisotropic layer in the optically-anisotropic layer is λ/2 and incidence light $L_1$ as left circularly polarized light is incident into the optically-anisotropic layer, the incidence light $L_1$ transmits through the optically-anisotropic layer to be imparted with a phase difference of 180°, and the transmitted light $L_2$ is converted into right circularly polarized light.

In addition, in a case where the incidence light $L_1$ transmits through the optically-anisotropic layer, an absolute phase thereof changes depending on the direction of the optical axis 30A of each of the liquid crystal compounds 30. In this case, the direction of the optical axis 30A changes while rotating in the arrow X direction. Therefore, the amount of change in the absolute phase of the incidence light $L_1$ varies depending on the direction of the optical axis 30A. Further, the liquid crystal alignment pattern that is formed in the optically-anisotropic layer is a pattern that is periodic in the arrow X direction. Therefore, as shown in FIG. 13, the incidence light $L_1$ transmitted through the optically-anisotropic layer is imparted with an absolute phase Q1 that is periodic in the arrow X direction corresponding to the direction of each of the optical axes 30A. As a result, an equiphase surface E1 that is tilted in a direction opposite to the arrow X direction is formed.

Therefore, the transmitted light $L_2$ is refracted to be tilted in a direction perpendicular to the equiphase surface E1 and travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrow X direction with respect to an incidence direction.

On the other hand, as conceptually shown in FIG. 14, in a case where the value of the product of the difference in refractive index of the liquid crystal compound and the thickness of the optically-anisotropic layer in the optically-anisotropic layer is λ/2 and incidence light $L_4$ as right circularly polarized light is incident into the optically-anisotropic layer, the incidence light $L_4$ transmits through the optically-anisotropic layer to be imparted with a phase difference of 180° and is converted into transmitted light $L_5$ of left circularly polarized light.

In addition, in a case where the incidence light $L_4$ transmits through the optically-anisotropic layer, an absolute phase thereof changes depending on the direction of the optical axis 30A of each of the liquid crystal compounds 30.

In this case, the direction of the optical axis 30A changes while rotating in the arrow X direction. Therefore, the amount of change in the absolute phase of the incidence light $L_4$ varies depending on the direction of the optical axis 30A. Further, the liquid crystal alignment pattern that is formed in the optically-anisotropic layer is a pattern that is periodic in the arrow X direction. Therefore, as shown in FIG. 14, the incidence light $L_4$ transmitted through the optically-anisotropic layer is imparted with an absolute phase Q2 that is periodic in the arrow X direction corresponding to the direction of each of the optical axes 30A.

Here, the incidence light $L_4$ is right circularly polarized light. Therefore, the absolute phase Q2 that is periodic in the arrow X direction corresponding to the direction of the optical axis 30A is opposite to the incidence light $L_1$ as left circularly polarized light. As a result, in the incidence light $L_4$, an equiphase surface E2 that is tilted in the arrow X direction opposite to that of the incidence light $L_1$ is formed.

Therefore, the incidence light $L_4$ is refracted to be tilted in a direction perpendicular to the equiphase surface E2 and travels in a direction different from a traveling direction of the incidence light $L_4$. This way, the incidence light $L_4$ is converted into the transmitted light $L_5$ of left circularly polarized light that is tilted by a predetermined angle in a direction opposite to the arrow X direction with respect to an incidence direction.

In the optically-anisotropic layer, it is preferable that the in-plane retardation value of the plurality of regions R is a half wavelength. It is preferable that an in-plane retardation $Re(550)=\Delta n_{550} \times d$ of the plurality of regions R of the optically-anisotropic layer with respect to the incidence light having a wavelength of 550 nm is in a range defined by the following Expression (1). Here, $\Delta n_{550}$ represents a difference in refractive index generated by refractive index anisotropy of the region R in a case where the wavelength of incidence light is 550 nm, and d represents the thickness of the optically-anisotropic layer.

$$200 \text{ nm} \leq \Delta n_{550} \times d \leq 350 \text{ nm} \tag{1}$$

That is, in a case where the in-plane retardation $Re(550)=\Delta n_{550} \times d$ of the plurality of regions R of the optically-anisotropic layer satisfies Expression (1), a sufficient amount of a circularly polarized light component in light incident into the optically-anisotropic layer can be converted into circularly polarized light that travels in a direction tilted in a forward direction or reverse direction with respect to the arrow X direction. It is more preferable that the in-plane retardation $Re(550)=\Delta n_{550} \times d$ satisfies 225 nm $\leq \Delta n_{550} \times d \leq$ 340 nm, and it is still more preferable that the in-plane retardation $Re(550)=\Delta n_{550} \times d$ satisfies 250 nm $\leq \Delta n_{550} \times d \leq$ 330 nm.

Expression (1) is a range with respect to incidence light having a wavelength of 550 nm. However, an in-plane retardation $Re(\lambda)=\Delta n_\lambda \times d$ of the plurality of regions R of the optically-anisotropic layer with respect to incidence light having a wavelength of $\lambda$ nm is preferably in a range defined by the following Expression (1-2) and can be appropriately set.

$$0.35 \times \lambda \text{nm} \leq \Delta n_\lambda \times d \leq 0.65 \times \lambda \text{nm} \tag{1-2}$$

In addition, the value of the in-plane retardation of the plurality of regions R of the optically-anisotropic layer in a range outside the range of Expression (1) can also be used. Specifically, by satisfying $\Delta n_{550} \times d < 200$ nm or 350 nm $< \Delta n_{550} \times d$, the light can be classified into light that travels in the same direction as a traveling direction of the incidence light and light that travels in a direction different from a traveling direction of the incidence light. In a case where $\Delta n_{550} \times d$ approaches 0 nm or 550 nm, the amount of the light component that travels in the same direction as a traveling direction of the incidence light increases, and the amount of the light component that travels in a direction different from a traveling direction of the incidence light decreases.

Further, it is preferable that an in-plane retardation $Re(450)=\Delta n_{450} \times d$ of each of the plurality of regions R of the optically-anisotropic layer with respect to incidence light having a wavelength of 450 nm and an in-plane retardation $Re(550)=\Delta n_{550} \times d$ of each of the plurality of regions R of the optically-anisotropic layer with respect to incidence light having a wavelength of 550 nm satisfy the following Expression (2). Here, $\Delta n_{450}$ represents a difference in refractive index generated by refractive index anisotropy of the region R in a case where the wavelength of incidence light is 450 nm.

$$(\Delta n_{450} \times d)/(\Delta n_{550} \times d) < 1.0 \tag{2}$$

Expression (2) represents that the liquid crystal compound 30 in the optically-anisotropic layer has reverse dispersion properties. That is, by satisfying Expression (2), the optically-anisotropic layer can correspond to incidence light having a wide range of wavelength.

Here, by changing the single period A of the liquid crystal alignment pattern formed in the optically-anisotropic layer, refraction angles of the transmitted light components $L_2$ and $L_5$ can be adjusted. Specifically, as the single period A of the liquid crystal alignment pattern decreases, light components transmitted through the liquid crystal compounds 30 adjacent to each other more strongly interfere with each other. Therefore, the transmitted light components $L_2$ and $L_5$ can be more largely refracted.

In addition, refraction angles of the transmitted light components $L_2$ and $L_5$ with respect to the incidence light components $L_1$ and $L_4$ vary depending on the wavelengths of the incidence light components $L_1$ and $L_4$ (the transmitted light components $L_2$ and $L_5$). Specifically, as the wavelength of incidence light increases, the transmitted light is largely refracted. That is, in a case where incidence light is red light, green light, and blue light, the red light is refracted to the highest degree, and the blue light is refracted to the lowest degree.

Further, by reversing the rotation direction of the optical axis 30A of the liquid crystal compound 30 that rotates in the arrow X direction, the refraction direction of transmitted light can be reversed.

The optically-anisotropic layer is formed of a cured layer of a liquid crystal composition including a rod-shaped liquid crystal compound or a disk-shaped liquid crystal compound, and has a liquid crystal alignment pattern in which an optical axis of the rod-shaped liquid crystal compound or an optical axis of the disk-shaped liquid crystal compound is aligned as described above.

By forming an alignment film on the support 20, applying the liquid crystal composition to the alignment film, and curing the applied liquid crystal composition, the optically-anisotropic layer consisting of the cured layer of the liquid crystal composition can be obtained. Although the optically-anisotropic layer functions as a so-called λ/2 plate, the present invention also includes an aspect where a laminate including the support 20 and the alignment film that are integrated functions as a so-called λ/2 plate.

In addition, the liquid crystal composition for forming the optically-anisotropic layer includes a rod-shaped liquid crystal compound or a disk-shaped liquid crystal compound and may further include other components such as a leveling agent, an alignment controller, a polymerization initiator, a crosslinking agent, or an alignment assistant. In addition, the liquid crystal composition may include a solvent.

In addition, it is preferable that the optically-anisotropic layer has a wide range for the wavelength of incidence light and is formed of a liquid crystal material having a reverse birefringence dispersion. In addition, it is also preferable that the optically-anisotropic layer can be made to have a substantially wide range for the wavelength of incidence light by imparting a twist component to the liquid crystal composition or by laminating different phase difference layers. For example, in the optically-anisotropic layer, a method of realizing a λ/2 plate having a wide-range pattern by laminating two liquid crystal layers having different twisted directions is disclosed in, for example, JP2014-089476A and can be preferably used in the present invention.

—Rod-Shaped Liquid Crystal Compound—

As the rod-shaped liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-shaped liquid crystal compound, not only the above-described low molecular weight liquid crystal molecules but also high molecular weight liquid crystal molecules can be used.

It is preferable that the alignment of the rod-shaped liquid crystal compound is immobilized by polymerization. Examples of the polymerizable rod-shaped liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-064627. Further, as the rod-shaped liquid crystal compound, for example, compounds described in JP1999-513019A (JP-H11-513019A) and JP2007-279688A can be preferably used.

—Disk-Shaped Liquid Crystal Compound—

As the disk-shaped liquid crystal compound, for example, compounds described in JP2007-108732A and JP2010-244038A can be preferably used.

In a case where the disk-shaped liquid crystal compound is used in the optically-anisotropic layer, the liquid crystal compound 30 rises in the thickness direction in the optically-anisotropic layer, and the optical axis 30A derived from the liquid crystal compound is defined as an axis perpendicular to a disk surface, that is so-called, a fast axis.

In the present invention, it is not necessary that the 180° rotation period in the optically-anisotropic layer is uniform over the entire surface. That is, the optically-anisotropic layer may have regions having different lengths of the 180° rotation period in a plane.

In addition, the optically-anisotropic layer may have a portion where the direction of the optical axis is constant as long as a part thereof has the liquid crystal alignment pattern in which the direction of the optical axis rotates in at least one in-plane direction. In addition, the optically-anisotropic layer may have a liquid crystal alignment pattern in which the direction of the optical axis rotates in a plurality of directions.

In the optical elements shown in FIGS. 13 and 14, the optical axis 30A of the liquid crystal compound 30 in the liquid crystal alignment pattern of the optically-anisotropic layer continuously rotates only in the arrow X direction.

However, the present invention is not limited thereto, and various configurations can be used as long as the optical axis 30A of the liquid crystal compound 30 in the optically-anisotropic layer continuously rotates in the one in-plane direction.

In addition, the optical element may include a plurality of optically-anisotropic layers. By providing a plurality of optically-anisotropic layers, the diffraction efficiency can be improved. In a case where the optical element includes a plurality of optically-anisotropic layers, the single periods Λ of the liquid crystal alignment patterns of the optically-anisotropic layers may be the same as or different from each other. In addition, the liquid crystal alignment patterns may vary depending on the optically-anisotropic layers.

Here, the length of the single period Λ in the alignment pattern of the optically-anisotropic layer is not particularly limited. In a case where the light guide element 44 shown in FIG. 3 is used, from the viewpoint of, for example, diffracting light that is vertically incident into the optical laminate at an angle where the light can be totally reflected in the light guide plate 42, the length of the single period Λ is preferably 50 µm or less, more preferably 10 µm or less, and still more preferably 3 µm or less.

In consideration of the accuracy of the liquid crystal alignment pattern and the like, the single period Λ in the liquid crystal alignment pattern of the optically-anisotropic layer is preferably 0.1 µm or more.

In addition, in the present invention, the optically-anisotropic layer does not have a cholesteric structure. That is, the liquid crystal compound is not helically aligned along a thickness direction of the optically-anisotropic layer. As described above, in the optical laminate according to the embodiment of the present invention, in order to obtain a large diffraction angle by diffracting light twice, it is necessary that the optically-anisotropic layer allows transmission of light. Therefore, the optically-anisotropic layer does not have the cholesteric structure that reflects light.

However, in the optically-anisotropic layer, the liquid crystal compound may be loosely twisted and aligned in the thickness direction to the extent that light is not reflected. By loosely twisting and aligning the liquid crystal compound, the diffraction efficiency can be improved.

<<Method of Forming Optically-Anisotropic Layer>>

For example, a method of forming the optically-anisotropic layer includes: a step of applying a liquid crystal composition including the prepared liquid crystal compound to the alignment film; and a step of curing the applied liquid crystal composition.

The liquid crystal composition may be prepared using a well-known method in the related art. In addition, for the application of the liquid crystal composition, various well-known methods used for applying liquid, for example, bar coating, gravure coating, or spray coating can be used. In addition, the coating thickness of the liquid crystal composition (the thickness of the coating film) that is required to obtain an optically-anisotropic layer having a desired thickness may be appropriately set depending on the liquid crystal composition and the like.

Here, the alignment pattern is formed on the alignment film. Therefore, the liquid crystal compound of the liquid crystal composition applied to the alignment film is aligned along the alignment pattern (anisotropic period pattern) of the alignment film.

The liquid crystal composition is optionally dried and/or heated and then cured. The liquid crystal composition may be cured using a well-known method such as photopolymerization or thermal polymerization. For the polymerization, photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

By curing the liquid crystal composition, the liquid crystal compound in the liquid crystal composition is immobilized in a state (liquid crystal alignment pattern) where the liquid crystal compound is aligned along the alignment pattern of the alignment film. As a result, an optically-anisotropic layer having a liquid crystal alignment pattern in which a direction of an optical axis derived from the liquid crystal compound changes while continuously rotating in at least one in-plane direction is formed. The liquid crystal alignment pattern of the optically-anisotropic layer will be described below in detail.

When the optically-anisotropic layer is completed, the liquid crystal compound does not have to exhibit liquid crystallinity. For example, the molecular weight of the polymerizable liquid crystal compound may be increased by a curing reaction such that the liquid crystallinity thereof is lost.

[Patterned Cholesteric Liquid Crystal Layer]

Figure 15:
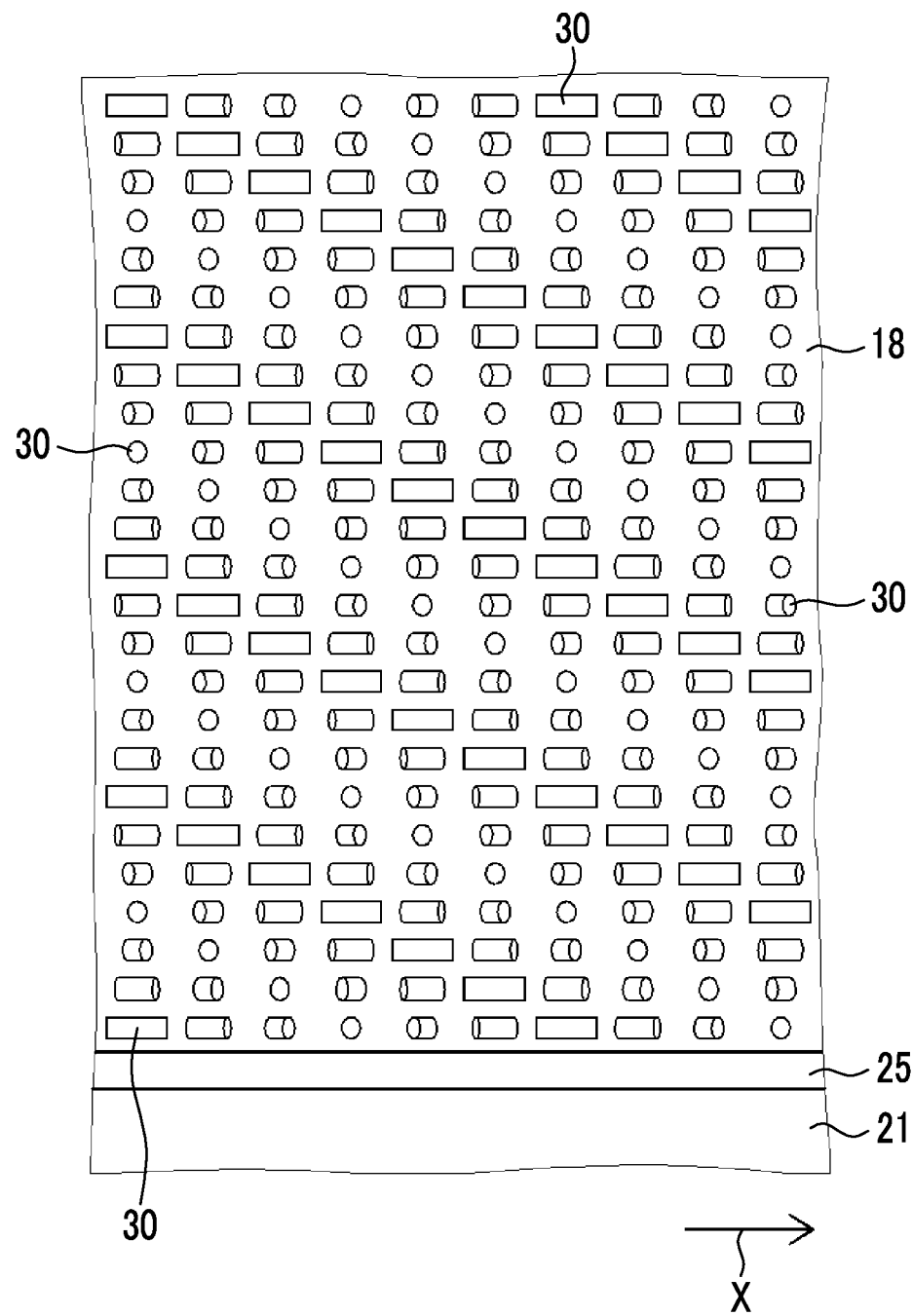
FIG. 15 is a schematic cross-sectional view showing a patterned cholesteric liquid crystal layer.

The patterned cholesteric liquid crystal layer 18 will be described using an optical element in which a patterned cholesteric liquid crystal layer is formed on a support as shown in FIG. 15.

FIG. 15 is a side view conceptually showing an example of the optical element including the patterned cholesteric liquid crystal layer.

The optical element shown in FIG. 15 includes a support 21, an alignment film 25, and a patterned cholesteric liquid crystal layer 18.

As the support 21, the same support as the above-described support 20 can be appropriately used.

In addition, in the present invention, a configuration in which the support 20 is peeled off and the patterned cholesteric liquid crystal layer is transferred may be adopted.

The alignment film 25 is an alignment film for aligning the liquid crystal compound 30 to a predetermined liquid crystal alignment pattern during the formation of the patterned cholesteric liquid crystal layer.

Although described below, the patterned cholesteric liquid crystal layer has a liquid crystal alignment pattern in which a direction of an optical axis 30A (refer to FIG. 16) derived from the liquid crystal compound 30 changes while continuously rotating in one in-plane direction. Accordingly, the alignment film 25 is formed such that the patterned cholesteric liquid crystal layer can form the liquid crystal alignment pattern.

The alignment film 25 is the same as the above-described alignment film 24, except for alignment pattern.

In addition, as the method of forming the alignment film 25, the above-described method of forming the alignment film of the optically-anisotropic layer can be appropriately used.

The patterned cholesteric liquid crystal layer 18 is a layer obtained by immobilizing a cholesteric liquid crystalline phase, and has a cholesteric liquid crystal structure in which the liquid crystal compound is helically twisted and aligned along a helical axis parallel to a thickness direction. In the cholesteric liquid crystal layer 18, a configuration in which the liquid crystal compound 30 is helically rotated once (rotated by 360) and laminated is set as one helical pitch, and plural pitches of the helically turned liquid crystal compound 30 are laminated.

In addition, the patterned cholesteric liquid crystal layer 18 has the liquid crystal alignment pattern in which the direction of the optical axis 30A derived from the liquid crystal compound 30 changes while continuously rotating in at least one in-plane direction.

This way, the patterned cholesteric liquid crystal layer 18 has wavelength selective reflection properties. For example, in a case where the patterned cholesteric liquid crystal layer 18 reflects right circularly polarized light of red light, the patterned cholesteric liquid crystal layer 18 reflects right circularly polarized light in a red wavelength range and allows transmission of the other light.

On the other hand, in the patterned cholesteric liquid crystal layer 18, the liquid crystal compound 30 rotates in the one in-plane direction and is aligned. Therefore, the reflected light is diffracted.

Accordingly, the patterned cholesteric liquid crystal layer 18 reflects right circularly polarized light or left circularly polarized light having a selective reflection wavelength and diffracts the reflected light.

<<Cholesteric Liquid Crystalline Phase>>

The cholesteric liquid crystalline phase exhibits selective reflection properties with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

Accordingly, in the optical element shown in FIG. 15, the patterned cholesteric liquid crystal layer 18 is a layer obtained by immobilizing a left-twisted cholesteric liquid crystalline phase.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection range (circularly polarized light reflection range) where selective reflection is exhibited depends on $\Delta n$ of the cholesteric liquid crystalline phase and the helical pitch P and complies with a relationship of $\Delta\lambda = \Delta n \times P$. Therefore, the width of the selective reflection range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the application of the optical element and is, for example, 10 to 500 nm and preferably 20 to 300 nm and more preferably 30 to 100 nm.

<<Method of Forming Patterned Cholesteric Liquid Crystal Layer>>

The patterned cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 30 in the patterned cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the patterned cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the patterned cholesteric liquid crystal layer may further include a surfactant and a chiral agent.

—Polymerizable Liquid Crystal Compound—

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, an or alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586, WO95/024455, WO97/000600, WO98/023580, WO98/052905, JP1989-272551A (JP-H1-272551A), JP1994-016616A (JP-H6-016616A), JP1995-110469A (JP-H7-110469A), JP1999-80081A (JP-H11-80081A), and JP2001-328973A. Further, as the rod-shaped liquid crystal compound, for example, compounds described in JP1999-513019A (JP-H11-513019A) and JP2007-279688A can be preferably used. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Shaped Liquid Crystal Compound—

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

—Surfactant—

The liquid crystal composition used for forming the patterned cholesteric liquid crystal layer may include a surfactant.

It is preferable that the surfactant is a compound that can function as an alignment controller contributing to the stable or rapid formation of a cholesteric liquid crystalline phase with planar alignment. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. No. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth) acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

In a case where the patterned cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the patterned cholesteric liquid crystal layer is formed, the patterned cholesteric liquid crystal layer is formed by applying the liquid crystal composition to the alignment film, aligning the liquid crystal compound to a state of a cholesteric liquid crystalline phase, and curing the liquid crystal compound.

An application method is as described above.

The applied liquid crystal composition is optionally dried and/or heated and then is cured to form the patterned cholesteric liquid crystal layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

A curing method is as described above.

<<Liquid Crystal Alignment Pattern of Patterned Cholesteric Liquid Crystal Layer>>

As described above, in the present invention, the patterned cholesteric liquid crystal layer has the liquid crystal alignment pattern in which the direction of the optical axis 30A derived from the liquid crystal compound 30 forming the cholesteric liquid crystalline phase changes while continuously rotating in the one in-plane direction of the patterned cholesteric liquid crystal layer.

The optical axis 30A derived from the liquid crystal compound 30 is an axis having the highest refractive index in the liquid crystal compound 30, that is, a so-called slow axis. For example, in a case where the liquid crystal compound 30 is a rod-shaped liquid crystal compound, the optical axis 30A is along a rod-shaped major axis direction. In the following description, the optical axis 30A derived from the liquid crystal compound 30 will also be referred to as "the optical axis 30A of the liquid crystal compound 30" or "the optical axis 30A".

Figure 16:
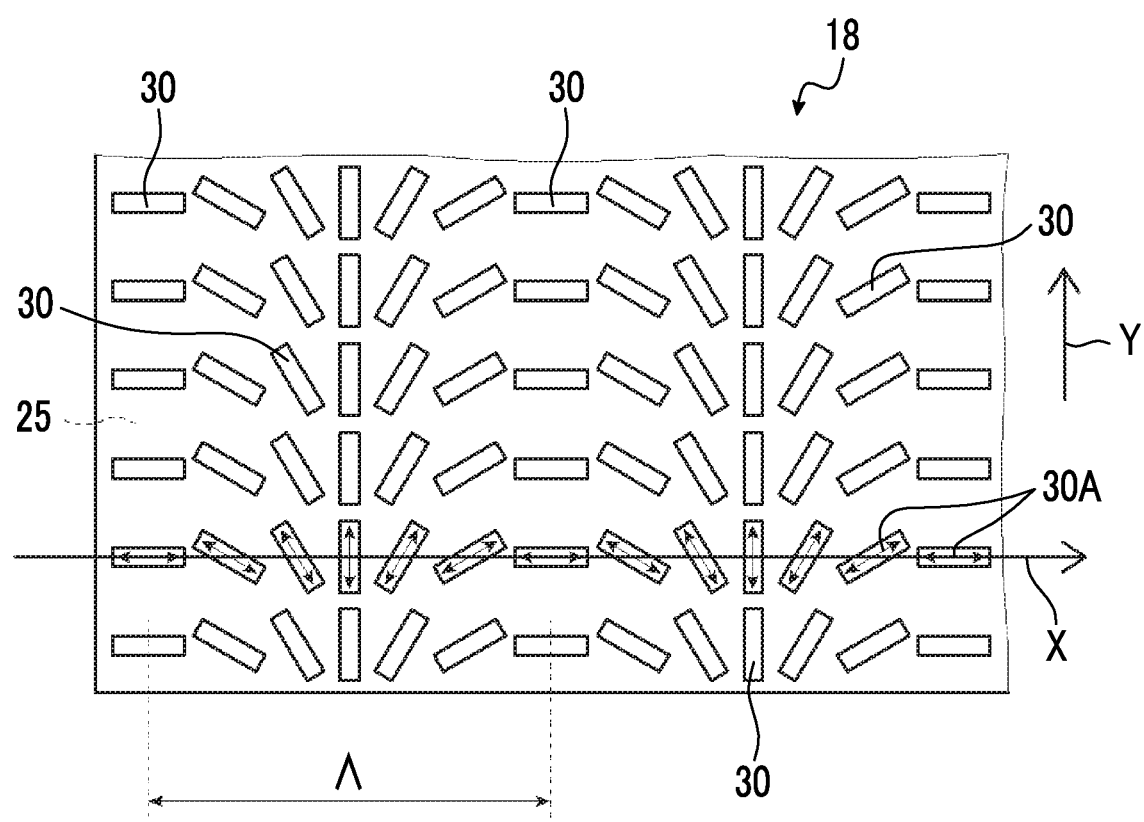
FIG. 16 is a top view showing the patterned cholesteric liquid crystal layer of FIG. 15.

FIG. 16 is a plan view conceptually showing the patterned cholesteric liquid crystal layer 18.

The plan view is a view in a case where the optical element is seen from the top in FIG. 15, that is, a view in a case where the optical element is seen from a thickness direction (laminating direction of the respective layers (films)).

In addition, in FIG. 16, in order to clarify the configuration of the patterned cholesteric liquid crystal layer 18, only the liquid crystal compound 30 on the surface of the alignment film 25 is shown as in FIG. 11.

As shown in FIG. 16, on the surface of the alignment film 25, the liquid crystal compound 30 forming the patterned cholesteric liquid crystal layer 18 is two-dimensionally disposed according to the alignment pattern formed on the alignment film 25 as the lower layer in a predetermined in-plane direction indicated by arrow X and a direction perpendicular to the one in-plane direction (arrow X direction).

Figure 17:
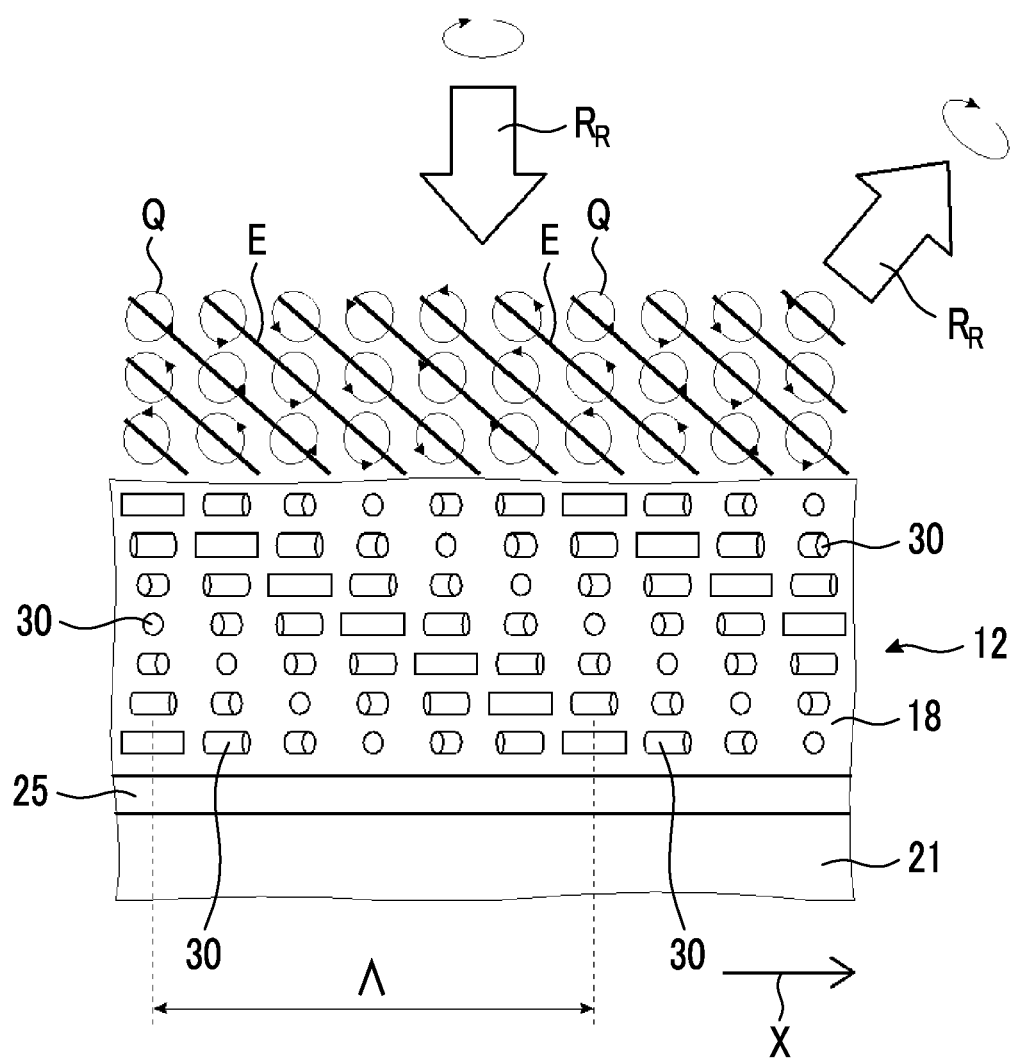
FIG. 17 is a diagram showing an action of the patterned cholesteric liquid crystal layer.

In the following description, the direction perpendicular to the arrow X direction will be referred to as "Y direction" for convenience of description. That is, in FIG. 15 and FIGS. 17 and 18 described below, the Y direction is a direction perpendicular to the paper plane.

In addition, the liquid crystal compound 30 forming the patterned cholesteric liquid crystal layer 18 has the liquid crystal alignment pattern in which the direction of the optical axis 30A changes while continuously rotating in the arrow X direction in a plane of the patterned cholesteric liquid crystal layer 18. In the example shown in the drawing, the liquid crystal compound 30 has the liquid crystal alignment pattern in which the optical axis 30A of the liquid crystal compound 30 changes while continuously rotating clockwise in the arrow X direction.

Specifically, "the direction of the optical axis 30A of the liquid crystal compound 30 changes while continuously rotating in the arrow X direction (the predetermined in-plane direction)" represents that an angle between the optical axis 30A of the liquid crystal compound 30, which is disposed in the arrow X direction, and the arrow X direction varies depending on positions in the arrow X direction, and the angle between the optical axis 30A and the arrow X direction sequentially changes from θ to θ+180° or θ−180° in the arrow X direction.

A difference between the angles of the optical axes 30A of the liquid crystal compound 30 adjacent to each other in the arrow X direction is preferably 45° or less, more preferably 15° or less, and still more preferably less than 15°.

On the other hand, in the liquid crystal compound 30 forming the patterned cholesteric liquid crystal layer 18, the directions of the optical axes 30A are the same in the Y direction perpendicular to the arrow X direction, that is, the Y direction perpendicular to the one in-plane direction in which the optical axis 30A continuously rotates.

In other words, in the liquid crystal compound 30 forming the patterned cholesteric liquid crystal layer 18, angles between the optical axes 30A of the liquid crystal compound 30 and the arrow X direction are the same in the Y direction.

In the present invention, in the liquid crystal alignment pattern of the liquid crystal compound 30, the length (distance) over which the optical axis 30A of the liquid crystal compound 30 rotates by 180° in the arrow X direction in which the optical axis 30A changes while continuously rotating in a plane is the length Λ of the single period in the liquid crystal alignment pattern.

That is, a distance between centers of two liquid crystal compounds 30 in the arrow X direction is the length Λ of the single period, the two liquid crystal compounds having the same angle in the arrow X direction. Specifically, as shown in FIG. 16, a distance of centers in the arrow X direction of two liquid crystal compounds 30 in which the arrow X direction and the direction of the optical axis 30A match each other is the length Λ of the single period. In the following description, the length Λ of the single period will also be referred to as "single period Λ".

In addition, in the following description, in order to distinguish between the single periods Λ of the patterned cholesteric liquid crystal layers, the single period Λ in the R reflection patterned cholesteric liquid crystal layer 18R will also be referred to as "$\Lambda_R$", the single period Λ in the G reflection patterned cholesteric liquid crystal layer 18G will also be referred to as "$\Lambda_G$", and the single period Λ in the B reflection patterned cholesteric liquid crystal layer 18B will also be referred to as "$\Lambda_B$".

In the present invention, in the liquid crystal alignment pattern of the patterned cholesteric liquid crystal layer, the single period Λ is repeated in the arrow X direction, that is, in the one in-plane direction in which the direction of the optical axis 30A changes while continuously rotating.

The cholesteric liquid crystal layer obtained by immobilizing a cholesteric liquid crystalline phase typically reflects incident light (circularly polarized light) by specular reflection.

On the other hand, the patterned cholesteric liquid crystal layer 18 reflects incidence light in a direction having an angle in the arrow X direction with respect to the incidence light. The patterned cholesteric liquid crystal layer 18 has the liquid crystal alignment pattern in which the optical axis 30A changes while continuously rotating in the arrow X direction in a plane (the predetermined in-plane direction). Hereinafter, the description will be made with reference to FIG. 17.

As described above, the patterned cholesteric liquid crystal layer 18 selectively reflects one circularly polarized light in a selective reflection wavelength. For example, a case where the selective reflection wavelength of the patterned cholesteric liquid crystal layer 18 is red light and right circularly polarized light is reflected will be taken into consideration. In a case where light is incident into the patterned cholesteric liquid crystal layer 18, the patterned cholesteric liquid crystal layer 18 reflects only right circularly polarized light RR of red light and allows transmission of the other light.

In a case where the right circularly polarized light RR of red light incident into the patterned cholesteric liquid crystal layer 18 is reflected from the patterned cholesteric liquid crystal layer 18, the absolute phase changes depending on the directions of the optical axes 30A of the respective liquid crystal compounds 30.

Here, in the patterned cholesteric liquid crystal layer 18, the optical axis 30A of the liquid crystal compound 30 changes while rotating in the arrow X direction (the one in-plane direction). Therefore, the amount of change in the absolute phase of the incident right circularly polarized light RR of red light varies depending on the directions of the optical axes 30A.

Further, the liquid crystal alignment pattern formed in the patterned cholesteric liquid crystal layer 18 is a pattern that is periodic in the arrow X direction. Therefore, as conceptually shown in FIG. 17, an absolute phase Q that is periodic in the arrow X direction corresponding to the direction of the optical axis 30A is assigned to the right circularly polarized light RR of red light incident into the patterned cholesteric liquid crystal layer 18.

In addition, the direction of the optical axis 30A of the liquid crystal compound 30 with respect to the arrow X direction is uniform in the disposition of the liquid crystal compound 30 in the Y direction perpendicular to arrow X direction.

As a result, in the patterned cholesteric liquid crystal layer 18, an equiphase surface E that is tilted in the arrow X direction with respect to an XY plane is formed for the right circularly polarized light RR of red light.

Therefore, the right circularly polarized light RR of red light is reflected in the normal direction of the equiphase surface E, and the reflected right circularly polarized light RR of red light is reflected in a direction that is tilted in the arrow X direction with respect to the XY plane (main surface of the patterned cholesteric liquid crystal layer 18).

Here, a reflection angle of light from the patterned cholesteric liquid crystal layer in which the optical axis 30A of the liquid crystal compound 30 continuously rotates in the arrow X direction (in-plane direction) varies depending on the length Λ of the single period of the liquid crystal alignment pattern over which the optical axis 30A rotates by 180° in the arrow X direction, that is, depending on the single period Λ. Specifically, as the length of the single period Λ decreases, the angle of reflected light with respect to incidence light increases.

In the present invention, the single period Λ in the alignment pattern of the patterned cholesteric liquid crystal layer is not particularly limited and may be appropriately set depending on the use of the optical laminate 10 and the like.

In a case where the light guide element 44 shown in FIG. 3 is used, from the viewpoint of, for example, diffracting light that is vertically incident into the optical laminate at an angle where the light can be totally reflected in the light guide plate 42, the length of the single period Λ is preferably 50 μm or less, more preferably 10 μm or less, and still more preferably 3 μm or less.

In consideration of the accuracy of the liquid crystal alignment pattern and the like, the single period Λ in the liquid crystal alignment pattern of the patterned cholesteric liquid crystal layer is preferably 0.1 μm or more.

In addition, the optical laminate according to the embodiment of the present invention may include a plurality of patterned cholesteric liquid crystal layers 18 having different selective reflection wavelengths.

For example, in a case where the optical laminate includes a R reflection patterned cholesteric liquid crystal layer that reflects red light, a G reflection patterned cholesteric liquid crystal layer that reflects green light, and a B reflection patterned cholesteric liquid crystal layer that reflects blue light, by adjusting diffraction angles of the respective patterned cholesteric liquid crystal layers to be the same, the optical laminate can diffract red light, green light, and blue light in the same direction and can correspond to a full color image.

A reflection angle of light from the patterned cholesteric liquid crystal layer in which the optical axis 30A of the liquid crystal compound 30 continuously rotates in the one in-plane direction (arrow X direction) slightly varies depending on wavelengths of light to be reflected. Specifically, as the wavelength of light increases, the angle of reflected light with respect to incidence light increases. For example, in a case where the optical laminate includes patterned cholesteric liquid crystal layers that reflect red light, green light, and blue light, respectively, it is preferable that the lengths of the single periods Λ in the liquid crystal alignment patterns of the respective patterned cholesteric liquid crystal layers are adjusted such that the diffraction angle of light in the respective patterned cholesteric liquid crystal layers are the same.

In a case where the optical laminate includes a plurality of patterned cholesteric liquid crystal layers, the laminating order thereof is not particularly limited.

Hereinabove, the optical laminate, the light guide element, and the $\Lambda_R$ display device according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 1

<Preparation of Optical Laminate>

[Preparation of Support]

(Preparation of Core Layer Cellulose Acylate Dope)

The following composition was put into a mixing tank and was stirred with each other to dissolve the respective components. As a result, a cellulose acetate solution was prepared as a core layer cellulose acylate dope.

| Core layer cellulose acylate dope | |
|---|---|
| Cellulose acetate having an acetyl substitution degree of 2.88 | 100 parts by mass |
| Polyester A | 12 parts by mass |
| Ultraviolet absorber V | 2.3 parts by mass |
| Methylene chloride (first solvent) | 430 parts by mass |
| Methanol (second solvent) | 64 parts by mass |

Ultraviolet Absorber V

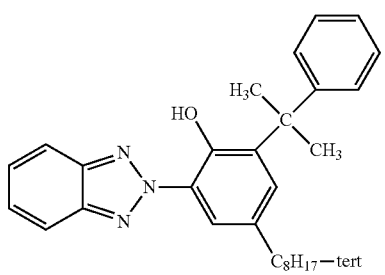

As the polyester A, a polyester A shown in [Table 1] of JP2015-227956A was used.
(Preparation of Outer Layer Cellulose Acylate Dope)
10 parts by mass of the following matting agent solution was added to 90 parts by mass of the above-described core layer cellulose acylate dope to prepare a cellulose acetate solution as an outer layer cellulose acylate dope.

| Matting agent solution | |
|---|---|
| Silica particles having an average particle size of 20 nm (AEROSIL R971, manufactured by Nippon Aerosil Co., Ltd. | 2 parts by mass |
| Methylene chloride (first solvent) | 76 parts by mass |
| Methanol (second solvent) | 11 parts by mass |
| Core layer cellulose acylate dope | 1 parts by mass |

The above-described core layer cellulose acylate dope and the above-described outer layer cellulose acylate dope were filtered through filter paper having an average pore size of 34 μm and a sintered metallic filter having an average pore size of 10 μm, respectively. Next, three layers of the core layer cellulose acylate dope and the outer layer cellulose acylate dope disposed on opposite sides of the core layer cellulose acylate dope were simultaneously cast on a drum at 20° C. from casting nozzles using a band casting machine.

Next, the obtained film was removed in a state where the solvent content was about 20 mass %, both ends of the film in the width direction were fixed using a tenter clip, and the film was horizontally stretched to a stretching ratio of 1.1% and dried.

Next, by transporting the film between rolls of a heat treatment device and further drying the film, a cellulose support having a thickness of 20 μm was prepared. In the prepared cellulose support, the thickness of the core layer was 15 μm, and the thickness of each of the outer layers disposed on opposite sides of the core layer was 2.5 μm.

(Saponification Treatment of Support)
The support prepared as described above was caused to pass through a dielectric heating roll at a temperature of 60° C. such that the support surface temperature was increased to 40° C.
Next, an alkali solution shown below was applied to a single surface of the support using a bar coater in an application amount of 14 mL (liter)/m², the support was heated to 110° C., and the support was transported for 10 seconds under a steam far infrared heater (manufactured by Noritake Co., Ltd.).

Next, 3 mL/m² of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

| Alkali Solution | |
|---|---|
| Potassium hydroxide | 4.70 parts by mass |
| Water | 15.80 parts by mass |
| Isopropanol | 63.70 parts by mass |
| Surfactant SF-1: $C_{14}H_{29}O(CH_2CH_2O)_2OH$ | 1.0 part by mass |
| Propylene glycol | 14.8 parts by mass |

(Formation of Undercoat Layer)
The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

| Undercoat Layer-Forming Coating Solution | |
|---|---|
| The following modified polyvinyl alcohol | 2.40 parts by mass |
| Isopropyl alcohol | 1.60 parts by mass |
| Methanol | 36.00 parts by mass |
| Water | 60.00 parts by mass |

Modified Polyvinyl Alcohol

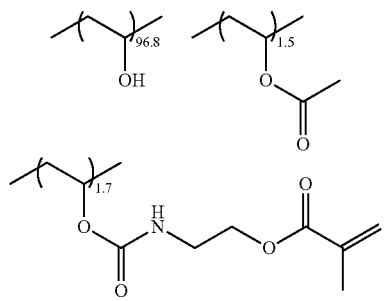

(Formation of Alignment Film)
The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

| Alignment Film-Forming Coating Solution | |
|---|---|
| Material A for photo-alignment | 1.00 part by mass |
| Water | 16.00 parts by mass |
| Butoxyethanol | 42.00 parts by mass |
| Propylene glycol monomethyl ether | 42.00 parts by mass |

—Material A for Photo-Alignment—

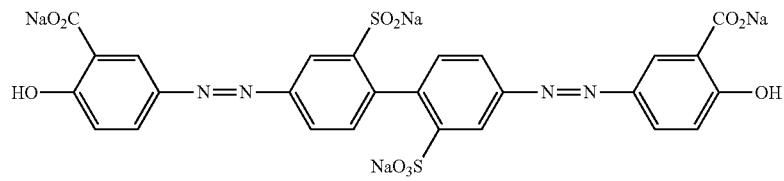

(Exposure of Alignment Film)

The alignment film was exposed using the exposure device shown in FIG. 12 to form an alignment film P-1 having an alignment pattern.

In the exposure device, a laser that emits laser light having a wavelength (325 nm) was used as the laser. The exposure dose of the interference light was 300 mJ/cm². The single period (the length over which the optical axis derived from the liquid crystal compound rotates by 180°) of an alignment pattern formed by interference of two laser beams was controlled by changing an intersecting angle (intersecting angle α) between the two beams.

(Formation of Patterned Cholesteric Liquid Crystal Layer)

As the liquid crystal composition forming the patterned cholesteric liquid crystal layer, the following composition C-1 was prepared. This composition C-1 is a liquid crystal composition forming a cholesteric liquid crystal layer (cholesteric liquid crystalline phase) that has a selective reflection center wavelength of 550 nm and reflects left circularly polarized light.

Composition C-1

| Composition C-1 | |
|---|---|
| Liquid crystal compound L-1 | 100.00 parts by mass |
| Chiral agent B | 9.13 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2840.00 parts by mass |

Liquid Crystal Compound L-1

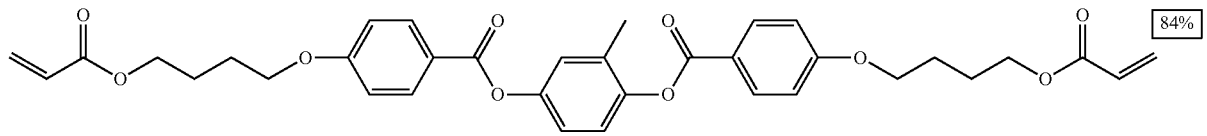

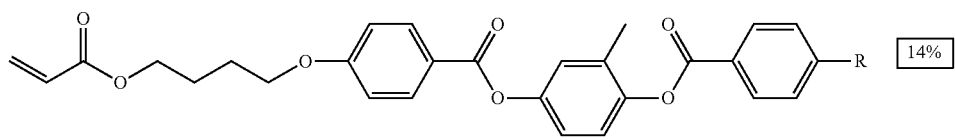

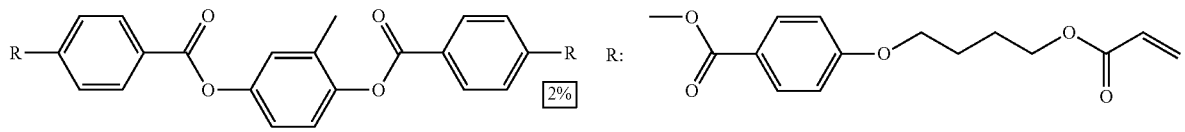

Leveling Agent T-1

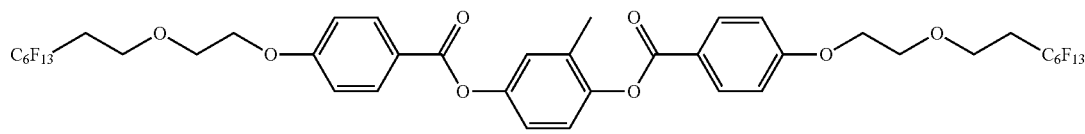

Chiral Agent B

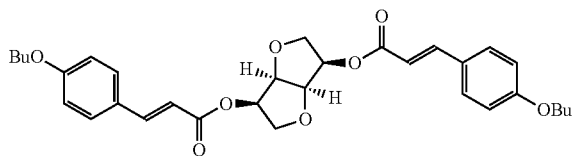

The patterned cholesteric liquid crystal layer was formed by applying multiple layers of the composition C-1 to the alignment film P-1. The application of the multiple layers refers to repetition of the following processes including: preparing a first liquid crystal immobilized layer by applying the first layer-forming composition C-1 to the alignment film, heating the composition C-1, cooling the composition C-1, and irradiating the composition C-1 with ultraviolet light for curing; and preparing a second or subsequent liquid crystal immobilized layer by applying the second or subsequent layer-forming composition C-1 to the formed liquid crystal immobilized layer, heating the composition C-1, cooling the composition C-1, and irradiating the composition C-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the following composition C-1 was applied to the alignment film P-1 to form a coating film, the coating film was heated using a hot plate at 70° C., the coating film was cooled to 25° C., and the coating film was irradiated with ultraviolet light having a wavelength of 365 nm at an irradiation dose of 300 mJ/cm$^2$ using a high-pressure mercury lamp in a nitrogen atmosphere. As a result, the alignment of the liquid crystal compound was immobilized. In this case, the thickness of the first liquid crystal layer was 0.2 μm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, a patterned cholesteric liquid crystal layer was obtained, and an optical laminate was prepared.

In a case where a cross-section of a coating layer was observed with a scanning electron microscope (SEM), the patterned cholesteric liquid crystal layer of the reflecting layer had 8 pitches.

It was verified using a polarizing microscope that the patterned cholesteric liquid crystal layer had a periodically aligned surface as shown in FIG. 16. In the liquid crystal alignment pattern of the patterned cholesteric liquid crystal layer, the single period over which the optical axis derived from the liquid crystal compound rotated by 180° was 1.5 μm.

Example 1

(Formation of Patterned Cholesteric Liquid Crystal Layer)

A patterned cholesteric liquid crystal layer was prepared using the same method as that of Comparative Example 1.

(Preparation of Phase Difference Layer)

(Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

(Exposure of Alignment Film)

By irradiating the obtained alignment film P-2 with polarized ultraviolet light (50 mJ/cm$^2$, using an extra high pressure mercury lamp), the alignment film was exposed.

(Formation of Phase Difference Layer)

As the liquid crystal composition forming the phase difference layer, the following composition R-1 was prepared.

Composition R-1

| Compostion R-1 | |
|---|---|
| Liquid crystal compound L-2 | 42.00 parts by mass |
| Liquid crystal compound L-3 | 42.00 parts by mass |
| Liquid crystal compound L-4 | 16.00 parts by mass |
| Polymerization initiator PI-1 | 0.50 parts by mass |
| Leveling agent G-1 | 0.20 parts by mass |
| Methyl ethyl ketone | 176.00 parts by mass |
| Cyclopentanone | 44.00 parts by mass |

—Liquid Crystal Compound L-2—

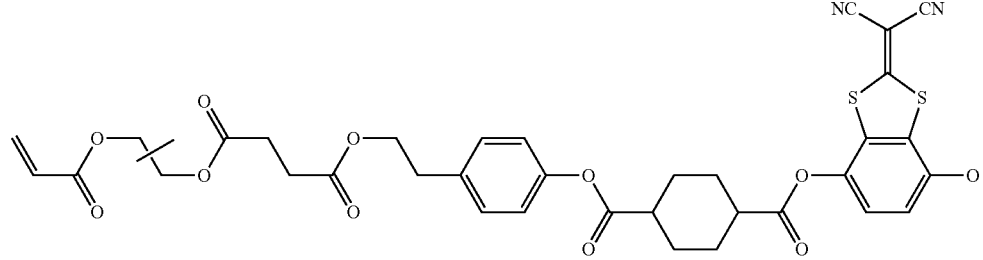

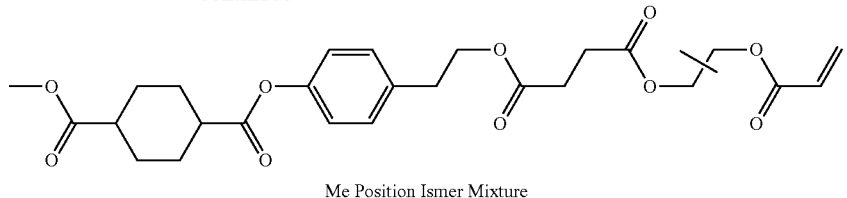

Me Position Ismer Mixture

—Liquid Crystal Compound L-3—

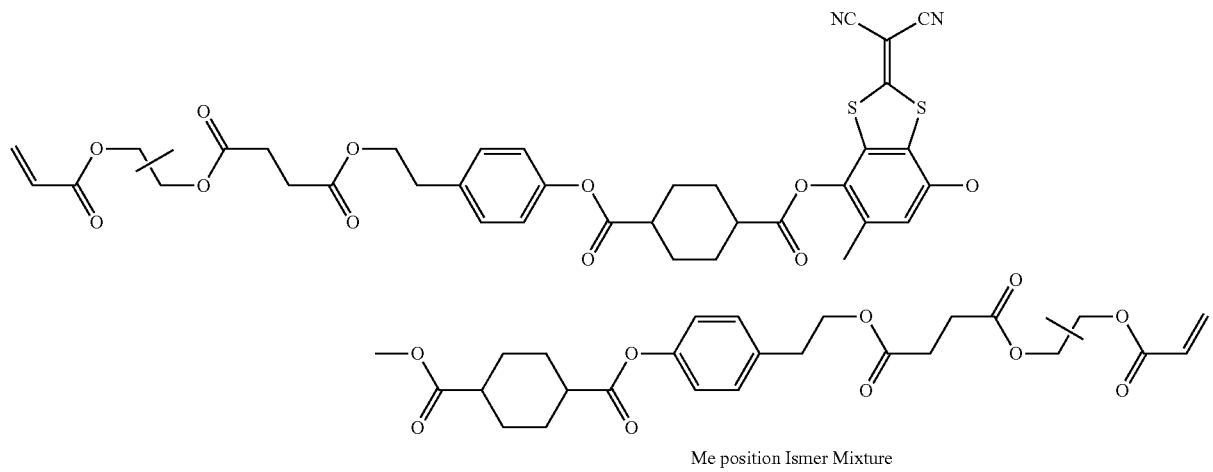

Me position Ismer Mixture

—Liquid Crystal Compound L-4—

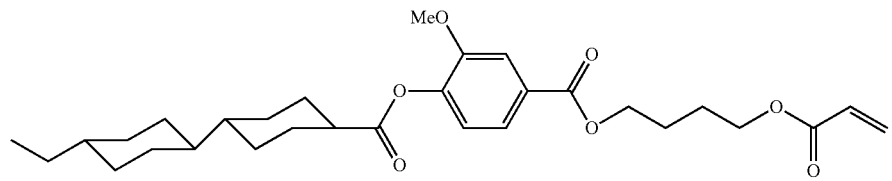 [SMILES: C=CC(=O)OCCCCOC(=O)c1ccc(OC(=O)C2CCC(C3CCC(CC)CC3)CC2)c(OC)c1]

—Polymerization initiator PI-1—

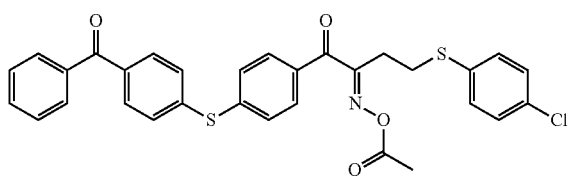 [SMILES: CC(=O)O/N=C(\CCSc1ccc(Cl)cc1)C(=O)c1ccc(Sc2ccc(C(=O)c3ccccc3)cc2)cc1]

—Leveling Agent G-1—

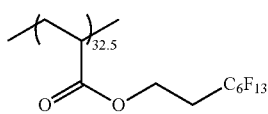

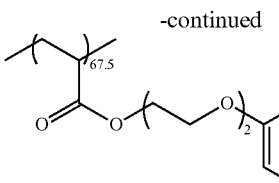

As the phase difference layer, a liquid crystal layer formed of a reverse dispersion liquid crystal compound was formed.

The liquid crystal layer was formed by applying the above-described composition R-1 to the alignment film P-2. The applied coating film was heated using a hot plate at 70° C., the coating film was cooled to 65° C., and the coating film was irradiated with ultraviolet light having a wavelength of 365 nm at an irradiation dose of 500 mJ/cm² using a high-pressure mercury lamp in a nitrogen atmosphere. As a result, the alignment of the liquid crystal compound was immobilized.

As a result, a horizontally aligned liquid crystal layer was obtained. Re(550) of the obtained phase difference layer was 275 nm.

The following composition V-1 was applied to the horizontal alignment layer to form a coating layer. The applied coating film was heated using a hot plate at 70° C., the coating film was cooled to 65° C., and the coating film was irradiated with ultraviolet light having a wavelength of 365 nm at an irradiation dose of 500 mJ/cm² using a high-pressure mercury lamp in a nitrogen atmosphere. As a result, the alignment of the liquid crystal compound was immobilized. As a result, the phase difference layer was obtained by forming a vertically aligned liquid crystal layer on the horizontally aligned liquid crystal layer.

In the obtained vertically aligned phase difference layer, Re(550) was 0 nm, and the thickness-direction retardation Rth(550) was −135 nm.

| <Composition V-1> | |
|---|---|
| Liquid crystal compound L-1 | 34.00 parts by mass |
| Liquid crystal compound L-2 | 44.00 parts by mass |
| Liquid crystal compound L-3 | 22.00 parts by mass |
| Polymerization initiator PI-1 | 1.50 parts by mass |
| Leveling agent T-2 | 0.40 parts by mass |
| Leveling agent T-3 | 0.20 parts by mass |
| Compound S-1 | 0.50 parts by mass |
| Compound M-1 | 14.00 parts by mass |
| Methyl ethyl ketone | 248.00 parts by mass |

Leveling Agent T-2

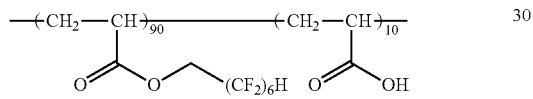

Leveling Agent T-3

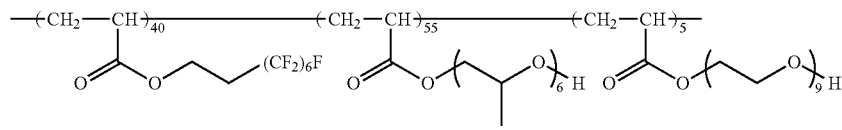

Compound S-1

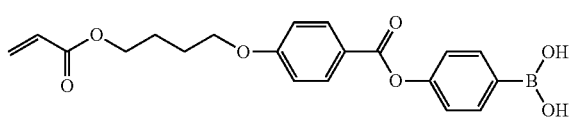 [SMILES: C=CC(=O)OCCCCOc1ccc(C(=O)Oc2ccc(B(O)O)cc2)cc1]

Compound M-1

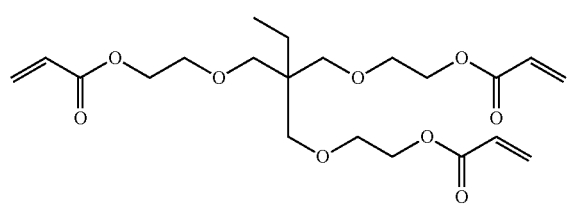 [SMILES: C=CC(=O)OCCOCC(CC)(COCCOC(=O)C=C)COCCOC(=O)C=C]

(Formation of Optically-Anisotropic Layer)

An alignment film was formed using the same method as that of the preparation of the patterned cholesteric liquid crystal layer according to Comparative Example 1, and the alignment film was exposed.

As the liquid crystal composition forming the optically-anisotropic layer, the following composition A-1 was prepared.

| Composition A-1 | |
|---|---|
| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2840.00 parts by mass |

The optically-anisotropic layer was formed by applying multiple layers of the composition A-1 to the alignment film P-1. The following processes were repeated, the processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above.

Regarding the first liquid crystal layer, the following composition A-1 was applied to the alignment film P-1 to form a coating film, the coating film was heated using a hot plate at 70° C., the coating film was cooled to 25° C., and the coating film was irradiated with ultraviolet light having a wavelength of 365 nm at an irradiation dose of 300 mJ/cm$^2$ using a high-pressure mercury lamp in a nitrogen atmosphere. As a result, the alignment of the liquid crystal compound was immobilized. In this case, the thickness of the first liquid crystal layer was 0.2 μm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, the optically-anisotropic layer was obtained.

The $\lambda n_\lambda$ of liquid crystal×the thickness (Re(λ)) was obtained by applying the composition A-1 to a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer (cured layer), and measuring the retardation value of the liquid crystal immobilized layer. The retardation value at a desired wavelength was appropriately measured using Axoscan (manufactured by Axo metrix Inc.).

Finally, in the optically-anisotropic layer, $\Delta n_{530}\times$ thickness (Re(550)) of the liquid crystals was 275 nm, and it was verified using a polarizing microscope that periodic alignment occurred on the surface as shown in FIG. 11. In the liquid crystal alignment pattern of the optically-anisotropic layer, the single period over which the optical axis derived from the liquid crystal compound rotated by 180° was 1.5 μm. Hereinafter, unless specified otherwise, "$\Delta n_{550}\times d$" and the like were measured as described above.

<Preparation of Optical Laminate>

The patterned cholesteric liquid crystal layer, the phase difference layer, and the optically-anisotropic layer prepared as described above were bonded in this order using an adhesive (manufactured by Soken Chemical & Engineering Co., Ltd., SK DINE 2057) to prepare an optical laminate. During bonding, the layers were bonded after peeling off the support and the alignment film from the respective patterned cholesteric liquid crystal layers, the phase difference layer, and the optically-anisotropic layer. In addition, the patterned cholesteric liquid crystal layer and the optically-anisotropic layer were bonded such that continuous rotation directions of the direction of the optical axis in the liquid crystal alignment pattern were the same.

Example 2

An optically-anisotropic layer was prepared using the same method as that of the optically-anisotropic member according to Example 1, except that, in a case where the alignment film was exposed using the exposure device shown in FIG. 12, the intersecting angle between two light components was changed.

Finally, in the optically-anisotropic layer, $\Delta n_{530}\times$ thickness (Re(550)) of the liquid crystals was 275 nm, and it was verified using a polarizing microscope that periodic alignment occurred on the surface as shown in FIG. 11. In the liquid crystal alignment pattern of the optically-anisotropic layer, the single period over which the optical axis derived from the liquid crystal compound rotated by 180° was 1.1 μm.

A patterned cholesteric liquid crystal layer and a phase difference layer were prepared using the same method as that of Example 1, and an optical laminate was prepared using the same method as that of Example 1.

Example 3

(Formation of Patterned Cholesteric Liquid Crystal Layer)

As the liquid crystal composition forming the patterned cholesteric liquid crystal layer, the following composition C-2 was prepared. This composition C-2 is a liquid crystal composition forming a cholesteric liquid crystal layer (cholesteric liquid crystalline phase) that has a selective reflection center wavelength of 550 nm and reflects right circularly polarized light.

| Composition C-2 | |
|---|---|
| Liquid crystal compound L-1 | 100.00 parts by mass |
| Chiral agent A | 5.46 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2840.00 parts by mass |

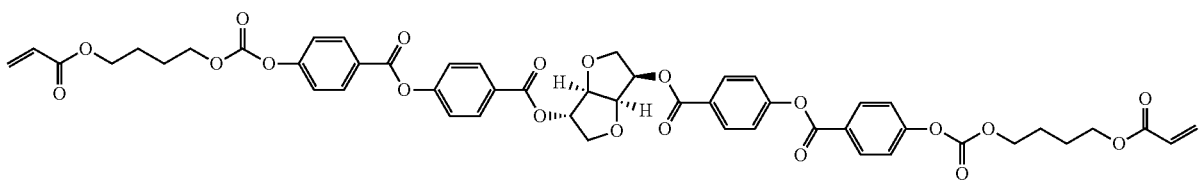 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

A patterned cholesteric liquid crystal layer was prepared using the same method as that of Example 1, except that the composition C-2 was used.

An optically-anisotropic layer was prepared using the same method as that of Example 1.

The patterned cholesteric liquid crystal layer and the optically-anisotropic layer prepared as described above were bonded in this order using an adhesive to prepare an optical laminate. During bonding, the layers were bonded after peeling off the support and the alignment film from the patterned cholesteric liquid crystal layer and the optically-anisotropic layer. In addition, the patterned cholesteric liquid crystal layer and the optically-anisotropic layer were bonded such that continuous rotation directions of the direction of the optical axis in the liquid crystal alignment pattern were different.

Example 4

An optically-anisotropic layer was prepared using the same method as that of the optically-anisotropic member according to Example 1, except that, in a case where the alignment film was exposed using the exposure device shown in FIG. 12, the intersecting angle between two light components was changed.

Finally, in the optically-anisotropic layer, $\Delta n_{530} \times$ thickness (Re(550)) of the liquid crystals was 275 nm, and it was verified using a polarizing microscope that periodic alignment occurred on the surface as shown in FIG. 11. In the liquid crystal alignment pattern of the optically-anisotropic layer, the single period over which the optical axis derived from the liquid crystal compound rotated by 180° was 1.1 µm.

A patterned cholesteric liquid crystal layer was prepared using the same method as that of Example 3, and an optical laminate was prepared using the same method as that of Example 3.

Example 5

An optical laminate was prepared using the same method as that of Example 1, except that, in a case where the alignment film was exposed using the exposure device shown in FIG. 12, the intersecting angle between two light components was changed.

Example 6

An optical laminate was prepared using the same method as that of Example 3, except that, in a case where the alignment film was exposed using the exposure device shown in FIG. 12, the intersecting angle between two light components was changed.

Comparative Example 2

An optical laminate was prepared using the same method as that of Comparative Example 1, except that, in a case where the alignment film was exposed using the exposure device shown in FIG. 12, the intersecting angle between two light components was changed.

Example 11

A patterned cholesteric liquid crystal layer, a phase difference layer, and optically-anisotropic layers (two sets) were prepared using the same method as that of Example 2.

The optically-anisotropic layer (first optically-anisotropic layer), the patterned cholesteric liquid crystal layer, the phase difference layer, and the optically-anisotropic layer (second optically-anisotropic layer) prepared as described above were bonded in this order using an adhesive to prepare an optical laminate. During bonding, the layers were bonded after peeling off the support and the alignment film from the respective patterned cholesteric liquid crystal layers, the phase difference layer, and the optically-anisotropic layer. In addition, the patterned cholesteric liquid crystal layer adjacent to the phase difference and the optically-anisotropic layer were bonded such that continuous rotation directions of the direction of the optical axis in the liquid crystal alignment pattern were the same. Further, the two optically-anisotropic layers were bonded to each other such that the rotation directions in which the direction of the optical axis in the liquid crystal alignment pattern was continuous were different from each other.

Example 12

A patterned cholesteric liquid crystal layer and optically-anisotropic layers (two sets) were prepared using the same method as that of Example 4.

The optically-anisotropic layer, the patterned cholesteric liquid crystal layer and the optically-anisotropic layer prepared as described above were bonded in this order using an adhesive to prepare an optical laminate. During bonding, the layers were bonded after peeling off the support and the alignment film from the patterned cholesteric liquid crystal layer and the optically-anisotropic layer. In addition, the patterned cholesteric liquid crystal layer and the two optically-anisotropic layers were bonded such that continuous rotation directions of the direction of the optical axis in the liquid crystal alignment pattern were the same.

[Evaluation of Reflection Angle]

In a case where light was incident from the front (direction with an angle of 0° with respect to the normal line) of the prepared optical laminate on the first optically-anisotropic layer side, angles (reflection angles) of reflected light with respect to the incidence light were measured.

Specifically, each of laser beams having an output center wavelength in a green light range (550 nm) was caused to be vertically incident into the prepared optical laminate from a position at a distance of 50 cm in the normal direction, and reflected light was captured using a screen disposed at a distance of 50 cm to calculate a reflection angle.

Figure 18:
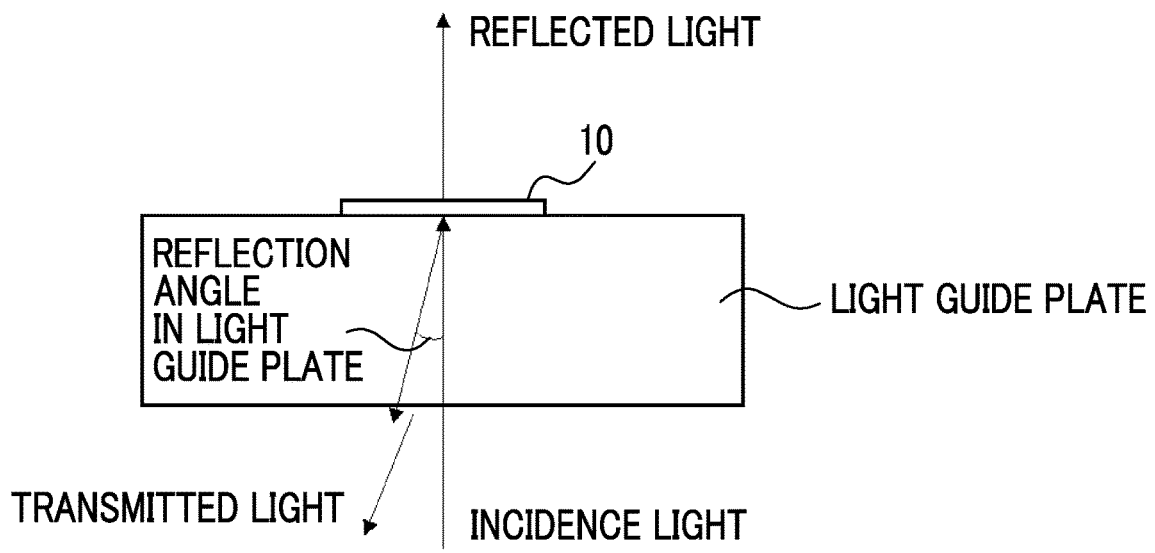
FIG. 18 is a diagram showing a method of measuring a reflection angle and a transmission angle.
Figure 19:
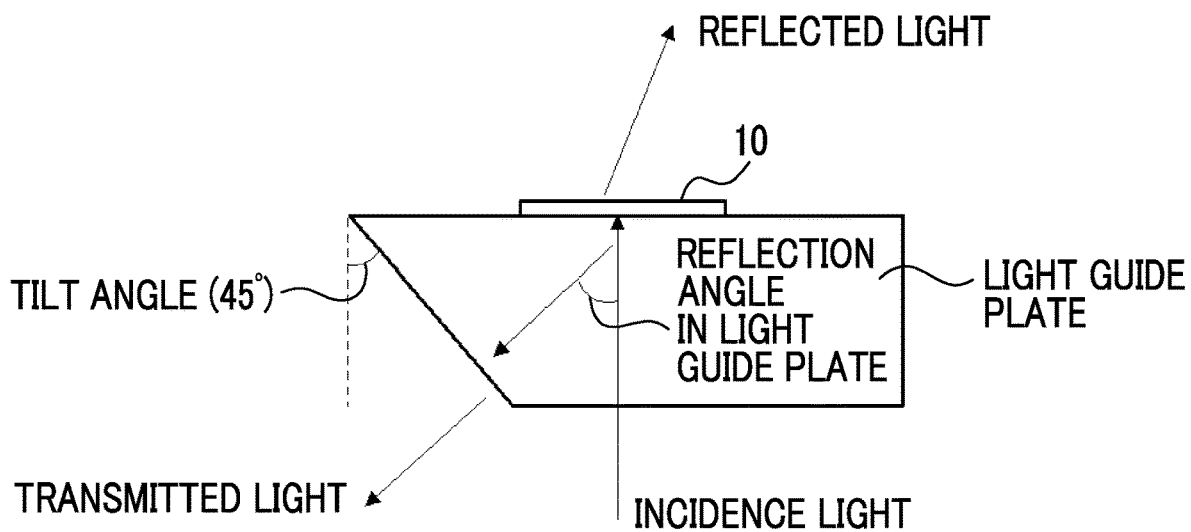
FIG. 19 is a diagram showing the method of measuring a reflection angle and a transmission angle.

In comparative Examples, the first optically-anisotropic layer side was bonded to the light guide plate as shown in FIG. 18 to evaluate a reflection angle. In addition, in Examples, light was totally reflected from a main surface of the light guide plate. Therefore, the first optically-anisotropic layer side was bonded to the light guide plate in which an edge surface was tilted as shown in FIG. 19, and the evaluation was performed. Based on the measured reflection angle, an angle of reflected light in the light guide plate was calculated using the Snell's law. As the light guide plate, glass having a refractive index of 1.52 was used.

[Evaluation of Transmission Angle]

In a case where light was incident from the front (direction with an angle of 0° with respect to the normal line) of the prepared optical laminate on the first optically-anisotropic layer side, angles (transmission angles) of transmitted light with respect to the incidence light were measured.

Specifically, each of laser beams having an output center wavelength in a green light range (550 nm) was caused to be vertically incident into the prepared optical laminate from a position at a distance of 50 cm in the normal direction, and transmitted light was captured using a screen disposed at a distance of 50 cm to calculate a transmission angle.

Based on the measured transmission angle, the angle of transmitted light in the light guide plate was calculated using the Snell's law. As the light guide plate, glass having a refractive index of 1.52 was used.

The results are shown in the following Tables 1 and 2.

TABLE 1

| | | | Example 1 | Example 2 | Example 3 | Example 4 | Example 5 | Example 6 | Comparative Example 1 | Comparative Example 2 |
|---|---|---|---|---|---|---|---|---|---|---|
| Configuration | First Optically-Anisotropic Layer | Δnd (nm) | 275 | 275 | 275 | 275 | 275 | 275 | — | — |
| | | Length of Single Period Λ (μm) | 1.5 | 1.1 | 1.5 | 1.1 | 1.2 | 1.2 | — | — |
| | Phase Difference Layer | Δnd (nm) | 275 | 275 | — | — | 275 | — | — | — |
| | Patterned Cholesteric Liquid Crystal Layer | Selective Reflection Wavelength | 550 | 550 | 550 | 550 | 550 | 550 | 550 | 550 |
| | | Length of Single Period Λ (μm) | 1.5 | 1.5 | 1.5 | 1.5 | 1.2 | 1.2 | 1.5 | 1.2 |
| | Second Optically-Anisotropic Layer | Δnd (nm) | — | — | — | — | — | — | — | — |
| | | In-Plane Period Λ (μm) | — | — | — | — | — | — | — | — |
| Evaluation | Reflection Angle (°) | | 46 | 64 | 46 | 64 | 65 | 65 | 14 | 18 |
| | Transmission Angle (°) | | 14 | 19 | 14 | 19 | 18 | 18 | 0 | 0 |

TABLE 2

| | | | Example 11 | Example 12 |
|---|---|---|---|---|
| Configuration | First Optically-Anisotropic Layer | Δnd (nm) | 275 | 275 |
| | | Length of Single Period Λ (μm) | 1.1 | 1.1 |
| | Phase Difference Layer | Δnd (nm) | 275 | — |
| | Patterned Cholesteric Liquid Crystal Layer | Selective Reflection Wavelength | 550 | 550 |
| | | Length of Single Period Λ (μm) | 1.5 | 1.5 |
| | Second Optically-Anisotropic Layer | Δnd (nm) | 275 | 275 |
| | | In-Plane Pitch Λ (μm) | 1.1 | 1.1 |
| Evaluation | Reflection Angle (°) | | 64 | 64 |
| | Transmission Angle (°) | | 0 | 0 |

As shown in Tables 1 and 2, it can be seen that, in the optical laminate according to the embodiment of the present invention, a diffraction angle that is about three times the diffraction angle (transmission angle) of the single patterned cholesteric liquid crystal layer can be obtained.

In addition, it can be seen from a comparison between Examples 2 and 11 and between Examples 4 to 12 that the transmission angle can be made 0° C. by providing the second optically-anisotropic layer.

As can be seen from the above results, the effects of the present invention are obvious.

The present invention is suitably applicable to various uses where light is reflected in an optical device, for example, a diffraction element that causes light to be incident into a light guide plate of AR glasses or emits light to the light guide plate.

EXPLANATION OF REFERENCES 10, 10a to 10d: optical laminate
12: first optically-anisotropic layer
16: second optically-anisotropic layer
18, 18a, 18b: patterned cholesteric liquid crystal layer
19: phase difference layer
20, 21: support
24, 25: alignment film
30: liquid crystal compound
30A: optical axis
40: display (image display device)
42: light guide plate
44: light guide element
50: AR display device
60: exposure device
62: laser
64: light source
68: beam splitter
70A, 70B: mirror
72A, 72B: λ/4 plate
M: laser light
MA, MB: beam
$P_O$: linearly polarized light
$P_R$: right circularly polarized light
$P_L$: left circularly polarized light
Q1, Q2, Q: absolute phase
E1, E2, E: equiphase surface
U: user

What is claimed is:

1. An optical laminate comprising, in the following order:
  a first optically-anisotropic layer that is formed of a composition including a liquid crystal compound and has a liquid crystal alignment pattern in which a direction of an optical axis derived from the liquid crystal compound continuously rotates in at least one in-plane direction;
  a phase difference layer; and
  a patterned cholesteric liquid crystal layer that is formed of a composition including a liquid crystal compound and has a liquid crystal alignment pattern in which a direction of an optical axis derived from the liquid crystal compound continuously rotates in at least one in-plane direction, the liquid crystal compound being cholesterically aligned, wherein in the patterned cholesteric liquid crystal layer, a configuration in which the liquid crystal compound is helically rotated by 360° and laminated is set as one helical pitch, and a plurality of the helical pitches are laminated, and in the first optically-anisotropic layer and the patterned cholesteric liquid crystal layer, the one in-plane directions in which the direction of the optical axis derived from the liquid crystal compound continuously rotates are the same, and rotation directions of the direction of the optical axis derived from the liquid crystal compound in the one in-plane direction are the same.

2. The optical laminate according to claim 1, wherein the phase difference layer is a λ/2 plate.

3. The optical laminate according to claim 1, wherein the phase difference layer is a broadband λ/2 plate.

4. The optical laminate according to claim 1, wherein the phase difference layer has reverse wavelength dispersion properties.

5. An optical laminate comprising, in the following order:
a first optically-anisotropic layer that is formed of a composition including a liquid crystal compound and has a liquid crystal alignment pattern in which a direction of an optical axis derived from the liquid crystal compound continuously rotates in at least one in-plane direction; and
a patterned cholesteric liquid crystal layer that is formed of a composition including a liquid crystal compound and has a liquid crystal alignment pattern in which a direction of an optical axis derived from the liquid crystal compound continuously rotates in at least one in-plane direction, the liquid crystal compound being cholesterically aligned,
wherein in the first optically-anisotropic layer and the patterned cholesteric liquid crystal layer, the one in-plane directions in which the direction of the optical axis derived from the liquid crystal compound continuously rotates are the same, and rotation directions of the direction of the optical axis derived from the liquid crystal compound in the one in-plane direction are opposite to each other.

6. The optical laminate according to claim 1, wherein in a case where, in the first optically-anisotropic layer and the patterned cholesteric liquid crystal layer, a length over which the direction of the optical axis derived from the liquid crystal compound rotates by 180° in the one in-plane direction in which the direction of the optical axis derived from the liquid crystal compound changes while continuously rotating is set as a single period, lengths of single periods in the first optically-anisotropic layer and the patterned cholesteric liquid crystal layer are the same.

7. The optical laminate according to claim 1, comprising: two or more first optically-anisotropic layers.

8. The optical laminate according to claim 1, wherein in the first optically-anisotropic layer, the liquid crystal compound is twisted and aligned in a thickness direction.

9. The optical laminate according to claim 1, comprising: two or more patterned cholesteric liquid crystal layers having different selective reflection wavelengths.

10. The optical laminate according to claim 9, wherein in the two or more patterned cholesteric liquid crystal layers, turning directions of circularly polarized light to be reflected are the same.

11. The optical laminate according to claim 1, further comprising:
a second optically-anisotropic layer that is formed of a composition including a liquid crystal compound and has a liquid crystal alignment pattern in which a direction of an optical axis derived from the liquid crystal compound continuously rotates in at least one in-plane direction, the second optically-anisotropic layer being formed on a side of the patterned cholesteric liquid crystal layer opposite to the optically-anisotropic layer side,
wherein in the first optically-anisotropic layer and the second optically-anisotropic layer, the one in-plane directions in which the direction of the optical axis derived from the liquid crystal compound continuously rotates are the same.

12. A light guide element comprising:
the optical laminate according to claim 1; and
a light guide plate.

13. The light guide element according to claim 12, wherein the optical laminate is disposed at at least either an incidence position or an emission position of light in the light guide plate.

14. The light guide element according to claim 12, wherein in the first optically-anisotropic layer and the patterned cholesteric liquid crystal layer, the one in-plane direction in which the direction of the optical axis derived from the liquid crystal compound continuously rotates is parallel to a light guide direction of light in the light guide plate.

15. An AR display device comprising:
the light guide element according to claim 12; and
an image display device.

16. The optical laminate according to claim 2, wherein the phase difference layer is a broadband λ/2 plate.

17. The optical laminate according to claim 2, wherein the phase difference layer has reverse wavelength dispersion properties.

18. The optical laminate according to claim 2, wherein in a case where, in the first optically-anisotropic layer and the patterned cholesteric liquid crystal layer, a length over which the direction of the optical axis derived from the liquid crystal compound rotates by 180° in the one in-plane direction in which the direction of the optical axis derived from the liquid crystal compound changes while continuously rotating is set as a single period, lengths of single periods in the first optically-anisotropic layer and the patterned cholesteric liquid crystal layer are the same.

19. The optical laminate according to claim 2, comprising:
two or more first optically-anisotropic layers.

20. The optical laminate according to claim 2, wherein in the first optically-anisotropic layer, the liquid crystal compound is twisted and aligned in a thickness direction.

21. The optical laminate according to claim 1, wherein the patterned cholesteric liquid crystal layer reflects one circularly polarized light of a selective reflection wavelength, and
the first optically-anisotropic layer transmits and refracts light in a wavelength range including the selective reflection wavelength of the patterned cholesteric liquid crystal layer without reflecting the light.

22. The optical laminate according to claim 5,
wherein the patterned cholesteric liquid crystal layer reflects one circularly polarized light of a selective reflection wavelength, and
the first optically-anisotropic layer transmits and refracts light in a wavelength range including the selective reflection wavelength of the patterned cholesteric liquid crystal layer without reflecting the light.

* * * * *